(12) United States Patent
Pertsinidis et al.

(10) Patent No.: US 9,213,176 B2
(45) Date of Patent: Dec. 15, 2015

(54) IMAGING ARRANGEMENT AND MICROSCOPE

(75) Inventors: Alexandros Pertsinidis, Oakland, CA (US); Steven Chu, Chevy Chase, MD (US)

(73) Assignee: The Regents of The University of California, Oakland, CA (US)

( * ) Notice: Subject to any disclaimer, the term of this patent is extended or adjusted under 35 U.S.C. 154(b) by 1156 days.

(21) Appl. No.: 13/132,598

(22) PCT Filed: Dec. 1, 2009

(86) PCT No.: PCT/US2009/066249
§ 371 (c)(1),
(2), (4) Date: Sep. 22, 2011

(87) PCT Pub. No.: WO2010/065538
PCT Pub. Date: Jun. 10, 2010

(65) Prior Publication Data
US 2012/0002031 A1     Jan. 5, 2012

Related U.S. Application Data

(60) Provisional application No. 61/119,242, filed on Dec. 2, 2008.

(51) Int. Cl.
| | |
|---|---|
| *H04N 7/18* | (2006.01) |
| *G02B 21/18* | (2006.01) |
| *G02B 21/16* | (2006.01) |
| *G02B 21/00* | (2006.01) |

(52) U.S. Cl.
CPC ............... *G02B 21/18* (2013.01); *G02B 21/16* (2013.01); *G02B 21/0056* (2013.01); *G02B 21/0076* (2013.01)

(58) Field of Classification Search
None
See application file for complete search history.

(56) References Cited

U.S. PATENT DOCUMENTS

| | | | |
|---|---|---|---|
| 1,705,146 | A | 3/1929 | Willson |
| 5,162,941 | A * | 11/1992 | Favro et al. .................. 359/386 |
| 5,491,343 | A * | 2/1996 | Brooker ..................... 250/458.1 |
| 6,181,474 | B1 | 1/2001 | Ouderkirk et al. |
| 6,362,004 | B1 | 3/2002 | Noblett |
| 6,801,597 | B2 | 10/2004 | Webber |

(Continued)

OTHER PUBLICATIONS

Bobroff, N. Position measurement with a resolution and noise-limited instrument. Rev. Sci. Instrum. 57, 1152-1157 (1986).

(Continued)

*Primary Examiner* — Kate Luo
(74) *Attorney, Agent, or Firm* — Lawrence Berkeley National Laboratory

(57) ABSTRACT

An embodiment of the present invention is an imaging arrangement that includes imaging optics, a fiducial light source, and a control system. In operation, the imaging optics separate light into first and second tight by wavelength and project the first and second light onto first and second areas within first and second detector regions, respectively. The imaging optics separate fiducial light from the fiducial light source into first and second fiducial light and project the first and second fiducial light onto third and fourth areas within the first and second detector regions, respectively. The control system adjusts alignment of the imaging optics so that the first and second fiducial light projected onto the first and second detector regions maintain relatively constant positions within the first and second detector regions, respectively. Another embodiment of the present invention is a microscope that includes the imaging arrangement.

18 Claims, 19 Drawing Sheets

(56) References Cited

U.S. PATENT DOCUMENTS

| | | | |
|---|---|---|---|
| 7,154,598 B2 | 12/2006 | Montagu et al. | |
| 7,227,618 B1 | 6/2007 | Bi | |
| 2001/0031502 A1* | 10/2001 | Watson et al. | 436/172 |
| 2002/0154396 A1* | 10/2002 | Overbeck | 359/368 |
| 2003/0052264 A1* | 3/2003 | Baba et al. | 250/281 |
| 2006/0077865 A1* | 4/2006 | Eytan et al. | 369/125 |
| 2007/0035819 A1 | 2/2007 | Bahatt et al. | |
| 2007/0160175 A1* | 7/2007 | Lang | 376/103 |
| 2007/0171519 A1 | 7/2007 | Wolleschensky | |
| 2008/0158551 A1* | 7/2008 | Hess | 356/73 |
| 2008/0266652 A1* | 10/2008 | Yazdanfar et al. | 359/363 |

OTHER PUBLICATIONS

Yildiz, A. et al. Myosin V walks hand-over-hand: single fluorophore imaging with 1.5-nm localization. Science 300, 2061-2065 (2003).

Gordon, M. P., Ha, T. & Selvin, P. R. Single-molecule high-resolution imaging with photobleaching. Proc. Natl Acad. Sci. USA 101, 6462-6465 (2004).

Qu, X. et al. Nanometer-localized multiple single-molecule fluorescence microscopy. Proc. Natl Acad. Sci. USA 101, 11298-11303 (2004).

Ram, S., Ward, E. S. & Ober, R. J. Beyond Rayleigh's criterion: a resolution measure with application to single-molecule microscopy. Proc. Natl Acad. Sci. USA 103, 4457-4462 (2006).

Betzig, E. et al. Imaging intracellular fluorescent proteins at nanometer resolution. Science 313, 1642-1645 (2006).

Rust, M. J., Bates, M. & Zhuang, X. Sub-diffraction-limit imaging by stochastic optical reconstruction microscopy (STORM). Nature Methods 3, 793-796 (2006).

Hess, S. T., Girirajan, T. P. K. & Mason, M. D. Ultra-high resolution imaging by fluorescence photoactivation localization microscopy. Biophys. J. 91, 4258-4272 (2006).

Burns, D. H. et al. Strategies for attaining superresolution using spectroscopic data as constraints. Appl. Opt. 24, 154-161 (1985).

Bornfleth, H. et al. High-precision distance measurements and volume-conserving segmentation of objects near and below the resolution limit in three-dimensional confocal fluorescence microscopy. J. Microsc. 189, 118-136 (1998).

Betzig, E. Proposed method for molecular optical imaging. Opt. Lett. 20, 237-239 (1995).

van Oijen, A. M. et al. Far-field fluorescence microscopy beyond the diffraction limit. J. Opt. Soc. Am. A 16, 909-915 (1999).

Lacoste, T. D. et al. Ultrahigh-resolution multicolor colocalization of single fluorescent probes. Proc. Natl Acad. Sci. USA 97, 9461-9466 (2000).

Antelman, J. et al. Nanometer distance measurements between multicolor quantum dots. Nano Lett. 9, 2199-2205 (2009).

Koyama-Honda, I. et al. Fluorescence imaging for monitoring the colocalization of two single molecules in living cells. Biophys. J. 88, 2126-2136 (2005).

Churchman, L. S. et al. Single molecule high-resolution colocalization of Cy3 and Cy5 attached to macromolecules measures intramolecular distances through time. Proc. Natl Acad. Sci. USA 102, 1419-1423 (2005).

Heilemann, M. et al. High-resolution colocalization of single dye molecules by fluorescence lifetime imaging microscopy. Anal. Chem. 74, 3511-3517 (2002).

Hell, S. W. & Wichmann, J. Breaking the diffraction resolution limit by stimulated emission: stimulated-emission-depletion fluorescence microscopy. Opt. Lett. 19, 780-782 (1994).

Klar, T. A. et al. Fluorescence microscopy with diffraction resolution barrier broken by stimulated emission. Proc. Natl Acad. Sci. USA 97, 8206-8210 (2000).

Lauer, T. R. The photometry of undersampled point-spread functions. Publ. Astron. Soc. Pacif. 111, 1434-1443 (1999).

Boggon, T. J. et al. C-cadherin ectodomain structure and implications for cell adhesion mechanisms. Science 296, 1308-1313 (2002).

Pertz, O. et al. A new crystal structure, Ca21 dependence and mutational analysis reveal molecular details of E-cadherin homoassociation. EMBO J. 18, 1738-1747 (1999).

He, W., Cowin, P. & Stokes, D. L. Untangling desmosomal knots with electron tomography. Science 302, 109-113 (2003).

Chappuis-Flament, S. et al. Multiple cadherin extracellular repeats mediate homophilic binding and adhesion. J. Cell Biol. 154, 231-243 (2001).

Perret, E. et al. Trans-bonded pairs of E-cadherin exhibit a remarkable hierarchy of mechanical strengths. Proc. Natl Acad. Sci. USA 101, 16472-16477 (2004).

Zhang, Y. et al. Resolving cadherin interactions and binding cooperativity at the single-molecule level. Proc. Natl Acad. Sci. USA 106, 109-114 (2009).

Pokutta, S. et al. Conformational changes of the recombinant extracellular domain of E-cadherin upon calcium binding. Eur. J. Biochem. 223, 1019-1026 (1994).

Koch, A. W. et al. Calcium binding and homoassociation of E-cadherin domains. Biochemistry 36, 7697-7705 (1997).

Nagar, B. et al. Structural basis of calcium-induced E-cadherin rigidification and dimerization. Nature 380, 360-364 (1996).

Sivasankar, S. et al. Characterizing the initial encounter complex in cadherin adhesion. Structure 17, 1075-1081 (2009).

Kingshott, P., Thissen, H. & Griesser, H. J. Effects of cloud-point grafting, chain length, and density of PEG layers on competitive adsorption of ocular proteins. Biomaterials 23, 2043-2056 (2002).

Rasnik, I., McKinney, S. A. & Ha, T. Nonblinking and long-lasting single-molecule fluorescence imaging. Nature Methods 3, 891-893 (2006).

Vogelsang, J. et al. A reducing and oxidizing system minimizes photobleaching and blinking of fluorescent dyes. Angew. Chem. Int. Edn Engl. 47, 5465-5469 (2008).

Cheezum, M. K., Walker, W. F. & Guilford, W. H. Quantitative comparison of algorithms for tracking single fluorescent particles. Biophys. J. 81, 2378-2388 (2001).

Speidel, M., Jonas, A. & Florin, E. Three-dimensional tracking of fluorescent nanoparticles with subnanometer precision by use of off-focus imaging. Opt. Lett. 28, 69-71 (2003).

Lang, M. J. et al. Simultaneous, coincident optical trapping and single-molecule fluorescence. Nature Methods 1, 133-139 (2004).

van Dijk, M. A. et al. Combining optical trapping and single-molecule fluorescence spectroscopy: enhanced photobleaching of fluorophores. J. Phys. Chem. B 108, 6479-6484 (2004).

Brau, R. R. et al. Interlaced optical force-fluorescence measurements for single molecule biophysics. Biophys. J. 91, 1069-1077 (2006).

Alexandros Pertsinidis, Yunxiang Zhang, & Steven Chu, Subnanometre single-molecule localization, registration and distance measurements, Nature 466, 647-651, (Jul. 29, 2010).

Deniz et aL, Single-molecule biophysics: at the interface of biology, physics and chemistry, J. 1-20 R. Soc. Interface 2008 5, 15-45 article [online], May 22, 2007.

Martin Bohmer and Jorg Enderlein, Orientation imaging of single molecules by wide-field epifluorescence microscopy, J. Opt. Soc. Am. B/Vol. 20, No. 3/Mar. 2003.

Stefan W. Hell, Far-Field Optical Nanoscopy, Science, vol. 316, May 25, 2007.

Stefan Hell and Ernst H.K. Stelzer, Fundamental improvement of resolution with a 4Pi-confocal fluorescence microscope using two-photon excitation, Optics Communications 93 (1992) 277-282.

H. Pin Kao and A. S. Verkman, Tracking of Single Fluorescent Particles in Three Dimensions: Use of Cylindrical Optics to Encode Particle Position, Biophysical Journal vol. 67 Sep. 1994 1291-1300.

Matthew P. Gordon et al., Single-molecule high-resolution imaging with photobleaching, PNAS, Apr. 27, 2004, vol. 101, No. 17, 6462-6465.

L. Stirling Churchman et al., Single molecule high-resolution colocalization of Cy3 and Cy5 attached to macromolecules measures intramolecular distances through time, PNAS, Feb. 1, 2005, vol. 102, No. 5, 1419-1423.

Erdal Toprak et al., Three-Dimensional Particle Tracking via Bifocal Imaging, Nano Lett., vol. 7, No. 7, 2007, 2043-2045.

* cited by examiner

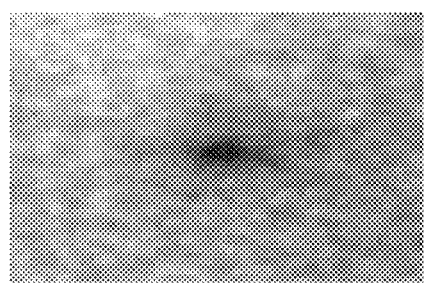
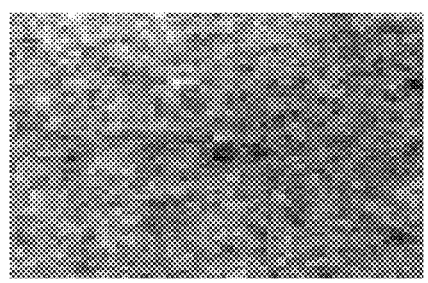
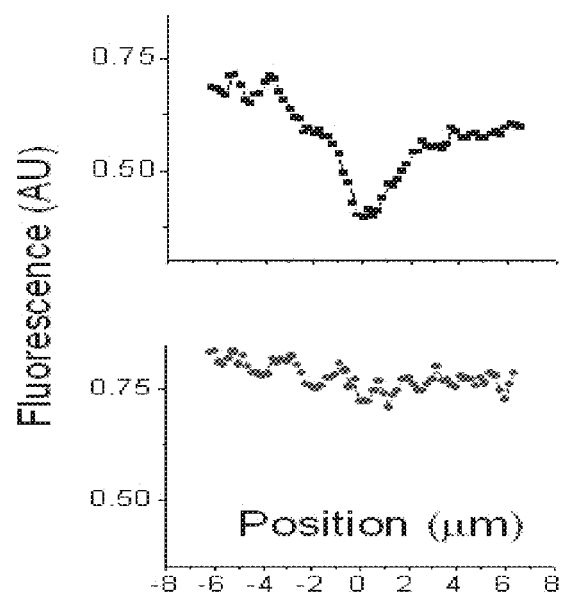
Fig. 19
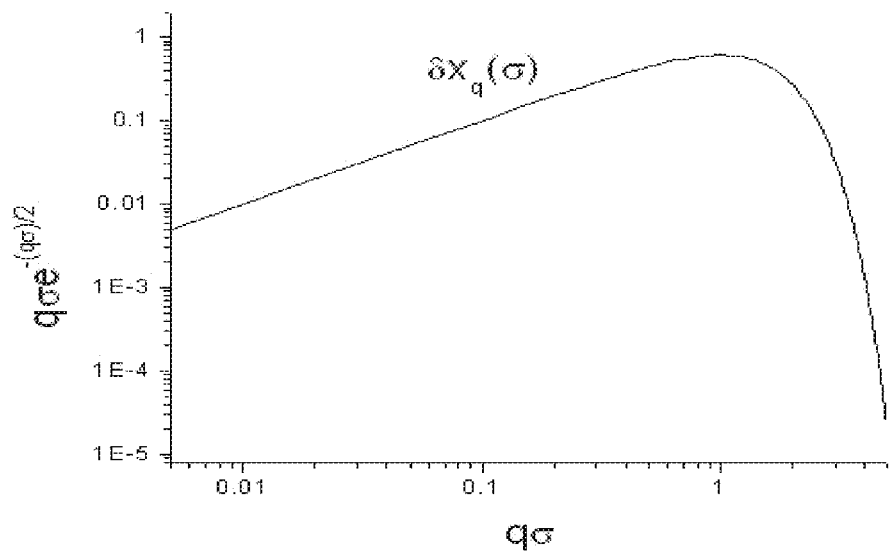
Fig. 20

US 9,213,176 B2

IMAGING ARRANGEMENT AND MICROSCOPE

RELATED APPLICATIONS

This application is the national phase application of International application number PCT/US2009/066249, filed Dec. 1, 2009, which claims priority to and the benefit of U.S. Provisional Application No. 61/119,242, filed on Dec. 2, 2008, which is hereby incorporated by reference in its entirety.

STATEMENT OF GOVERNMENT SUPPORT

This invention was made with government support under Contract No. DE-AC02-05CH11231 awarded by the U.S. Department of Energy. The government has certain rights in this invention.

FIELD OF THE INVENTION

The present invention relates to the field of imaging and, more particularly, to the field of imaging where imaging light is separated into at least two wavelength bands.

BACKGROUND OF THE INVENTION

Invented nearly 400 years ago, the optical microscope still remains one of the most powerful experimental tools in all of science and technology. Although diffraction limits the size of the smallest features one expects to resolve to $\sim\lambda/2$, i.e. ~250 nm for visible light, recently a new arsenal of techniques has emerged that allow fluorescence imaging with resolution below this fundamental limit. These approaches are based on the realization that fluorescent objects in close proximity can still be resolved if their emission is separated by wavelength, time, or fluorescence lifetime or by directly reducing the size of the point-spread-function (PSF) of the microscope. The ability to image below the diffraction limit has already enabled researchers to, for example, decipher the coordination of the two heads of a molecular motor, bar-code DNA sequence information, measure the nano-scale distribution of proteins inside a cell, and track in real-time the movement of small organelles.

Many biological processes involve the coordinated action of several components that assemble in large protein complexes. Their size (~10's of nm) and transient nature precludes studies of these complexes with conventional structural biology techniques such as single-particle reconstruction by electron microscopy and x-ray crystallography. Fluorescence microscopy on a nm scale could in principle enable real-time imaging of the position of single-molecules in physiological conditions with resolution rivaling that of electron microscopy. The resolution demonstrated to date is typically in the range of 10-20 nm, well above the size (~5 nm) of a typical protein molecule.

Two previous studies addressed the problem of co-localizing single molecules in simultaneous two-color wide-field fluorescence imaging. In "Fluorescence imaging for monitoring the colocalization of two single molecules in living cells," Biophys. J. 88, 2126-36, Koyama-Honda et al. teach that bright field imaging of a micro-fabricated array of 1 μm holes in a metal film, spaced by 5 μm, can be used to produce an overlay of two color images to within 20-30 nm. In "Single molecule high-resolution colocalization of Cy3 and Cy5 attached to macromolecules measures intramolecular distances through time," Proc. Nat. Acad. Sci. 102, 1419-23, Churchman et al. teach that co-localization to ~10 nm can be achieved by tracking a fluorescent bead that appears in two color images and that is translated by 0.5 μm on a grid pattern between successive images.

SUMMARY OF THE INVENTION

An embodiment of the present invention is an imaging arrangement that includes imaging optics, a fiducial light source, and a control system. The fiducial light source optically couples to the imaging optics. The control system electrically couples to the imaging optics. The imaging optics include first and second detector regions. In operation, the imaging optics separate light into first and second light by wavelength and project the first and second light onto first and second areas within the first and second detector regions, respectively. The imaging optics separate fiducial light from the fiducial light source into first and second fiducial light and project the first and second fiducial light onto third and fourth areas within the first and second detector regions, respectively. The control system adjusts alignment of the imaging optics so that the first and second fiducial light projected onto the first and second detector regions maintain relatively constant positions within the first and second detector regions, respectively.

Another embodiment of the present invention is a microscope that includes a stage, an objective, imaging optics, a fiducial light source, and a control system. The objective optically couples to the stage and the imaging optics. The fiducial light source optically couples to the imaging optics. The control system electrically couples to the imaging optics. The imaging optics include first and second detector regions. In operation, the objective collects light from a sample that is held by the stage. The imaging optics separate the light into first and second light by wavelength and project the first and second light onto first and second areas within the first and second detector regions, respectively. The imaging optics separate fiducial light from the fiducial light source into first and second fiducial light, and project the first and second fiducial light onto third and fourth areas within the first and second detector regions, respectively. The control system adjusts alignment of the imaging optics so that the first and second fiducial light projected onto the first and second detector regions maintain relatively constant positions within the first and second detector regions, respectively.

These and other aspects of the invention are discussed more fully below.

BRIEF DESCRIPTION OF THE DRAWINGS

FIG. 19 shows photo-bleaching of Cy3 markers (top panels) and elimination of photo-bleaching using chopping of green excitation and optical trapping laser beams (bottom panels) in an embodiment of a microscope of the present invention.

FIG. 20 provides a graph of a weighting factor for PRNU (photo response non-uniformity) of a CCD array that indicates that largest deviations in PRNU are created by inhomogeneities of the CCD array on a scale comparable to the width of a Gaussian peak that estimates a PSF (point spread function) from an emission source in an embodiment of a microscope of the present invention.

DETAILED DESCRIPTION OF THE INVENTION

Figure 1:
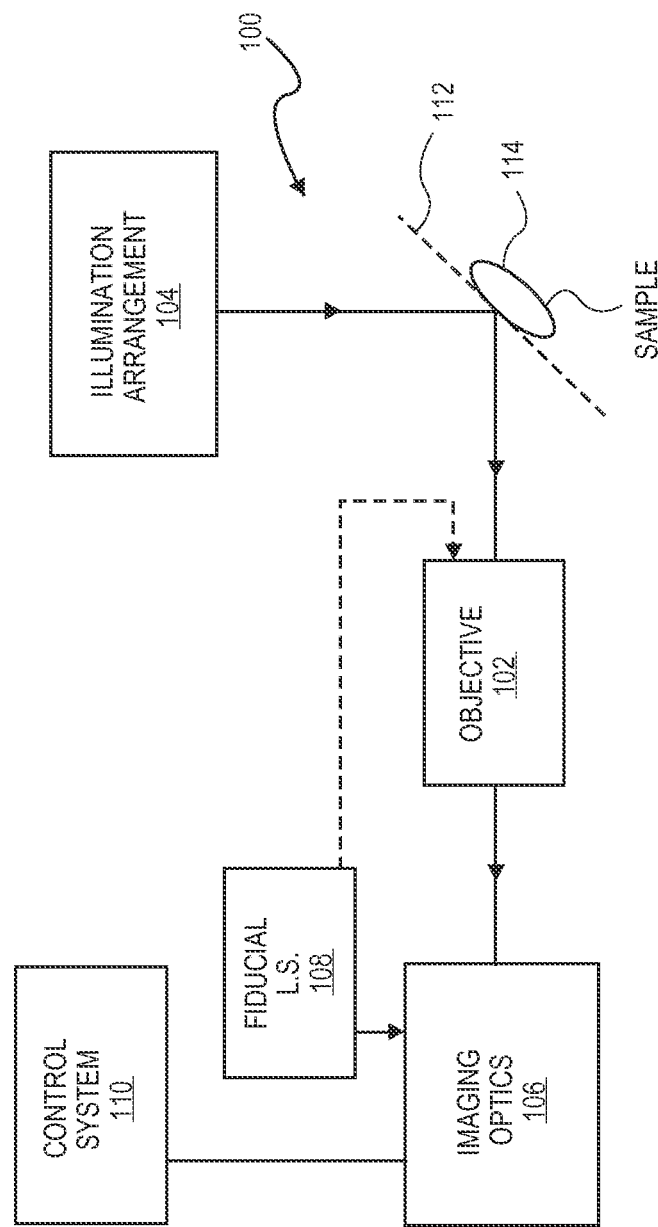
FIG. 1 schematically illustrates an embodiment of a microscope of the present invention.

An embodiment of a microscope of the present invention is illustrated schematically in FIG. 1. The microscope 100 includes an objective 102, an illumination arrangement 104, imaging optics 106, a fiducial light source 108, a control system 110, and a stage 112. The objective 102 optically couples the illumination arrangement 104 to the imaging optics 106. The fiducial light source 108 optically couples to the imaging optics 106. The control system 110 is electrically coupled to the imaging optics 106. The illumination arrangement provides light to a sample 114 that is held by the stage 112.

An embodiment of the microscope 100 is a total internal reflection microscope in which the illumination arrangement 104 causes dye markers within a region of the sample 112 to fluoresce by evanescently exciting the region, which causes at least two species of the dye markers to fluoresce at different wavelengths. For example, the dye markers may be Cy3 and Cy5 (cyanine 3 and 5) that fluoresce at 570 and 670 nm, respectively. In such a total internal reflection microscope, the imaging optics 106 form images of the fluorescing Cy3 and Cy5 on separate detector regions. Alternatively, the microscope 100 is some other suitable type of microscope that makes use of the imaging optics 106 where the imaging optics 106 display at least two wavelength bands on separate detector regions. For example, the microscope 100 may be a pseudo-TIR, epillumination, structured-illumination, or scanning-confocal illumination microscope.

In another embodiment, the microscope 100 is a 4π microscope using two opposite facing objectives. Illumination can be from both objectives in any of a range of modes (e.g., pseudo-TIR illumination, epillumination, structured-illumination, or scanning-confocal illumination) and fluorescent light can be collected from both objectives. In an embodiment of a 4π interferometric microscope of the present invention, fluorescent light can be detected coherently or non-coherently by adjusting a path length difference between two light paths. This embodiment is discussed more fully below under the heading of "Additional embodiments."

Figure 2:
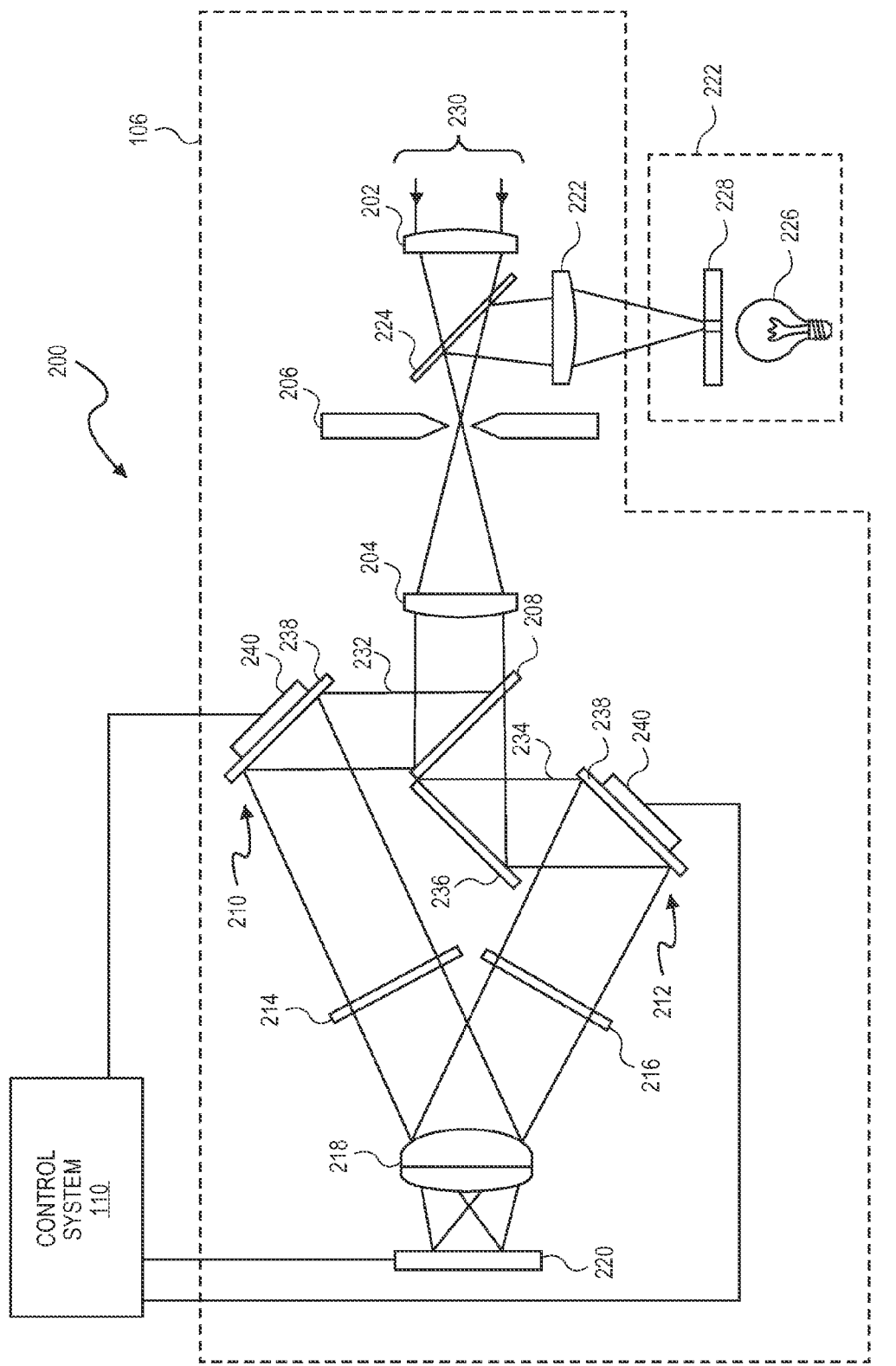
FIG. 2 illustrates an embodiment of an imaging arrangement of the present invention.

An embodiment of an imaging arrangement of the present invention is illustrated in FIG. 2. The imaging arrangement 200 includes the imaging optics 106, the fiducial light source 108, and the control system 110. The imaging optics 106 include relay lenses, 202 and 204, a field stop 206, a dichroic mirror 208, first and second piezo mirrors, 210 and 212, first and second band-pass filters, 214 and 216, an image lens 218, a CCD array 220 (i.e. a detector), a coupling lens 222, and a partially reflecting mirror 224 (e.g., a 95:5 partially reflecting mirror). An embodiment of the fiducial light source 108 includes a lamp 226 (e.g., a halogen lamp) and a pin hole 228 that produces a point source of light. Light 230 (e.g., light from the objective of the microscope 100 of FIG. 1) is relayed by the relay lenses, 202 and 204. The field stop 206 limits an image size that is projected through the remainder of the imaging optics 106. The dichroic mirror 208 splits the light into a short wavelength path 232 and a long wavelength path 234. A mirror 236 folds the long wavelength path 234. Each of the piezo mirrors, 210 and 212, includes a mirror 238 and a piezoelectric crystal 240 that causes the mirror 238 to tip or tilt in response to an electrical signal. The bandpass filters, 214 and 216, limit the light by wavelength in the short and long wavelength paths, 232 and 234, respectively. The image lens 218 focuses light from the short and long wavelength paths, 232 and 234, onto separate regions of the CCD array 220 to form separate short and long wavelength images, for example, green and red images from Cy3 and Cy5 dye markers in the sample 114 (FIG. 1). The CCD array 220 detects light in a two-dimensional array of pixels. The control system 110 is coupled to the CCD array 220 and the piezoelectric crystals 240 and it drives the crystals 240 to adjust the position of the long and short wavelength images within separate regions of the CCD array 220. The separate regions of the CCD array 220 may be referred to as image frames (e.g., green and red image frames for imaging Cy3 and Cy5 dye markers, respectively).

The coupling lens 222 and the partly reflecting mirror 224 combine the point source of light from the fiducial light source 108 with the light 230 from the objective 102 of the microscope 100 (FIG. 1). The imaging optics 106 transmits images of the point source of light into the long and short wavelength paths, 232 and 234, and forms images of the point source of light within the separate regions of the CCD array 220 but within areas of these regions that are away from the images formed from the light 230 from the objective 102 of the microscope 100.

It will be readily apparent to one skilled in the art that various modifications and replacement of components may be made to the imaging arrangement 200 and other arrangements of the present invention. For example, a lens may be replaced with a curved mirror or the fiducial light source may couple to the imaging arrangement 200 elsewhere (e.g., the fiducial light may enter the imaging arrangement 200 with the light 230).

Figure 3:
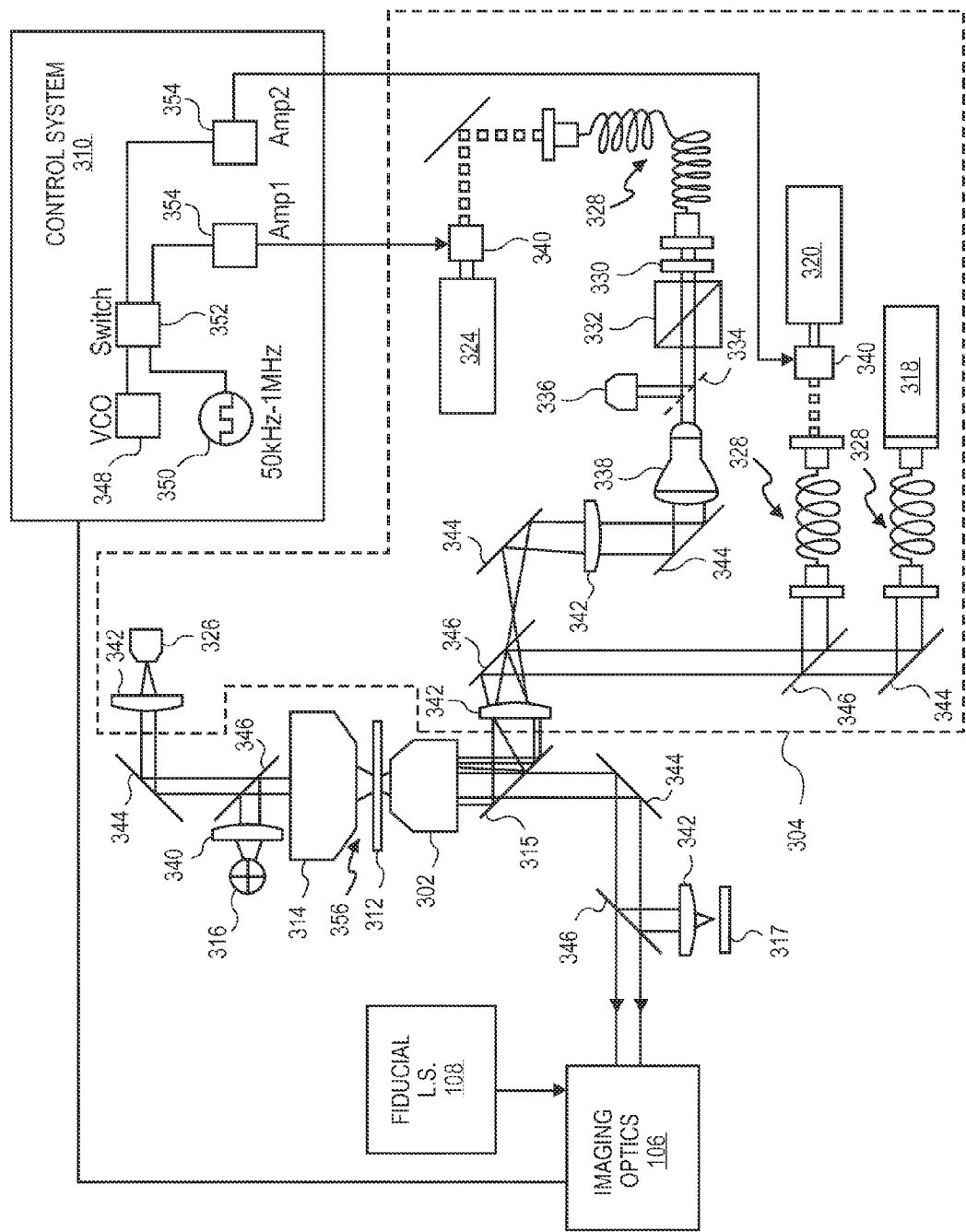
FIG. 3 illustrates an embodiment of a microscope of the present invention.

An embodiment of a total internal reflection microscope of the present invention is illustrated in FIG. 3. The microscope 300 includes an objective 302, an illumination arrangement 304, the imaging optics 106, the fiducial light source 108, a control system 310, a translation stage 312, a condenser 314, a poly-chroic mirror 315, a quadrant photo-detector 316, and a bright-field CCD array 317. The illumination arrangement 304 includes a red fluorescence excitation laser 318 (635 nm), a green fluorescence excitation laser 320 (532 nm), a trapping laser 324 (1064 nm), a blue LED 326, and single-mode fiber optic couplers 328. A light path for the trapping laser further includes a half-wave plate 330, a polarizing beam splitter 332, a pick-off mirror 334, a photodiode 336, and a 10× beam expander 338. The light path for the trapping laser 324 and a light path for the green excitation laser 320 each include an acousto-optic deflector 340. The microscope 300 also includes various other lenses 342, mirrors 344, and dichroic mirrors 346. The control system 310 includes a VCO (voltage controlled oscillator) 348, a clock signal source 350, a switch 352, and amplifiers 354.

The microscope 300 includes an actively stabilized imaging system that according to an embodiment includes the piezo mirrors, 210 and 212, the CCD array 220, the fiducial light source 108, and the control system 110 (FIG. 2). In this embodiment, the control system 110 drives the piezo mirrors, 210 and 212, to maintain the positions of the long and short wavelength images within the separate regions of the CCD array 220. According to another embodiment, the actively stabilized imaging system includes the piezo mirrors, 210 and 212, the CCD array 220, the fiducial light source 108, the translation stage 312 (FIG. 3), and the control system 310. In this embodiment, the control system 310 also adjusts a position of the translation stage 312 so that positions of images on the CCD array 220 are maintained within particular regions of the CCD array 220. For example, the control system 310 may adjust the translation stage 312 to maintain a center of an image of a Cy3 marker within a single pixel of the CCD array 220.

The microscope 300 includes an optical trapping arrangement that according to an embodiment includes the trapping laser 324, the light path from the trapping laser 324 to the objective 302, the condenser 314, and the quadrant photo-detector 316. Such an optical trapping arrangement may be used, for example, to extend a DNA molecule that is attached to a surface on one end and that has a dielectric microsphere attached the other end by drawing the microsphere towards a center of a focal point of a laser beam produced by the trapping laser 324. In an alternative embodiment, the optical trapping arrangement is replaced with another suitable trapping arrangement such as a magnetic, electrokinetic flow, or pressure driven flow trapping arrangement. A trapping arrangement of the present invention may actively or passively control a location of a molecule (i.e. through feedback control or maintaining a constant force, respectively).

The single-mode optical fiber couplers 328 optically couple the lasers, 318, 320, and 324, to the objective 302 and provide clean beam profiles and pointing stability. The acousto-optic deflectors 340 couple first order diffracted beams from the green fluorescence excitation laser 320 and the trapping laser 324 to the optical fiber couplers 328. The polarization of the beam from the trapping laser 324 is adjusted with the half-wave plate 320 and the polarization beam splitter 332. The pick-off mirror 334 and the photodiode 336 monitor an intensity of the trapping beam, which is expanded by the 10× beam expander 338. The condenser 314 collects forward scattered light from the trapping beam and projects the forward scattered light to the quadrant photo-detector 316, which acts as a high bandwidth (~100 kHz) position sensor for a trapped bead. The blue LED 326 illuminates a sample 356 and a resulting bright-field image is projected onto the bright-field CCD array 317. Tracking the trapped bead with the CCD array 317 provides greater dynamic range but with reduced bandwidth (~1 kHz). Cy3 and Cy5 dye markers in the sample 356 are evanescently excited by the green and red lasers, 320 and 318, respectively, in a total internal reflection mode to produce fluorescence. That is, light from the green and red lasers is coupled into a transparent portion of the stage where it totally internally reflects from a surface that the sample 356 rests upon. This causes evanescent excitation of a region of the sample 356 that is in close proximity to the surface. The fluorescence from the Cy3 and Cy5 markers is collected by the objective 302 and coupled to the imaging optics 106 (FIG. 2) where it is imaged onto the CCD array 220.

EXAMPLE

The present invention will be described in greater detail by way of a specific example. The following example is offered for illustrative purposes, and is intended neither to limit nor define the invention in any manner.

The microscope 300 provides sub-nanometer resolution in measurements of molecular-scale distances using far-field fluorescence imaging optics, at room temperature and in physiological buffer conditions. It uses the actively stabilized imaging system to achieve two-color single-molecule imaging with 0.5 nm absolute localization and registration accuracy. The optical trapping arrangement locks the position and orientation of a surface tethered DNA molecule to suppress Brownian motion in solution. This provides resolution with <0.8 nm absolute accuracy of distances between two different color dye-molecules (i.e., dye markers) attached at known positions along a DNA molecule. The microscope 300 also reduces the statistical uncertainty of a measurement of distance between two fluorescent molecules to ~0.2-0.4 nm (i.e., ~2-4 Å), achieving atomic resolution. This technique is applicable to other sub-wavelength imaging methods and allows deciphering in real-time at the single molecule level the structure and dynamics of large, multi-subunit, biological complexes.

The limiting factors in determining the distance between two fluorescent emitters at different wavelengths attached to a single bio-molecule, in physiological conditions, are examined here. By characterizing and correcting the combined non-linear distortions of the microscope 300 including the objective 302 and imaging optics 106, which includes the CCD array 220, two-color absolute distance measurements at the sub-nanometer scale have been achieved. In addition, uncertainties in resolving the position of single fluorescence molecules have been reduced to ~2-4 Å.

This performance is achieved using feedback control of the position of individual fluorescent molecules, allowing collection of >$10^6$ photons locked at the same position. The imaging system is calibrated by raster scanning a fluorescent emitter and correcting imperfections at pixel and sub-pixel scales by comparing the position of the fluorescence image and the known displacement of the sample, using a sub-nm accurate piezo translation stage (i.e., the translation stage 312).

The microscope 300 can also be used to precisely determine distances between different, stochastically excited molecules with atomic resolution. Using the sub-nm accurate piezo translation stage, known nanometer-scale shifts in the position of a single fluorescent molecule can be used to map the combined aberrations of the imaging system in the vicinity of any known pixel of the CCD array 220. In general, the sub-nanometer resolution presented here is directly applicable to many, if not all of the sub-resolution methods in the emerging fluorescence microscopy field.

The imaging arrangement 200 (FIG. 2) illustrates the experimental setup that was used to measure molecular scale distances between two different color fluorophores (e.g., two different dye markers). The two fluorophores (e.g., Cy3 and Cy5) were imaged in an objective-based total-internal reflection microscope 300 (FIG. 3) by splitting the collected fluorescence emission with the dichroic mirror 208 (FIG. 2) into two channels (e.g., a green channel and a red channel) and projecting the short and long wavelengths on two separate image regions of the CCD array 220 (i.e., within two separate image frames of the CCD array 220).

Results

Figure 4:
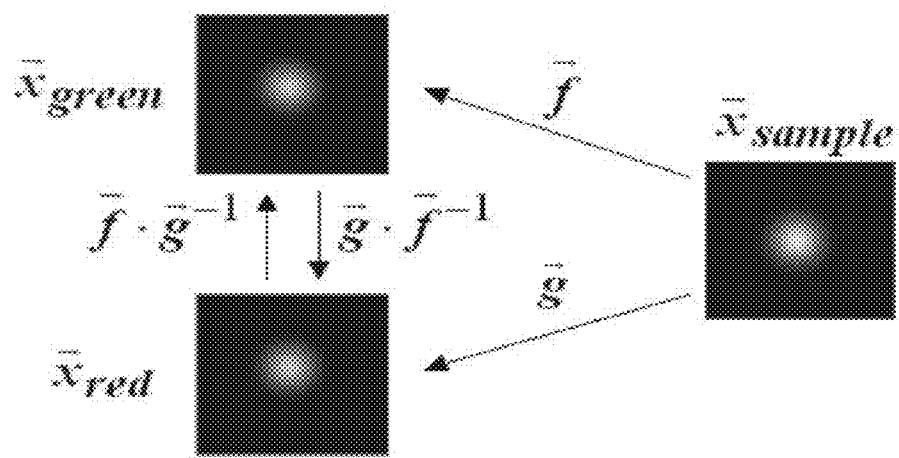
FIG. 4 illustrates mapping of a sample position to positions of fluorescent spots in green and red image frames in an embodiment of a microscope of the present invention.

FIG. 4 illustrates a mapping of a sample position $\vec{x}_{sample} \equiv (x_{sample}, y_{sample})$ to positions of fluorescent spots in a green image frame $\vec{x}_{green} \equiv (x_{green}, y_{green})$ and a red image frame $\vec{x}_{red} \equiv (x_{red}, y_{red})$ where the green and red fluorescent spots illuminate multiple pixels within the green and red image frames, respectively. Each fluorescent spot is fitted to a 2D Gaussian to locate a position of a center of the fluorophore in the image frames, $\vec{x}_{green} \equiv (x_{green}, y_{green})$ and $\vec{x}_{red} \equiv (x_{red}, y_{red})$ respectively, of the CCD array 220. The correspondence between the location $\vec{x}_{sample} \equiv (x_{sample}, y_{sample})$ of a molecule on the sample and its coordinates on the CCD array 220 is described by $\vec{x}_{green} \equiv \vec{f}(\vec{x}_{sample})$ and $\vec{x}_{red} \equiv \vec{g}(\vec{x}_{sample})$, where $\vec{f}$ and $\vec{g}$ are vector-valued functions. The distances between two fluorophores in real-space are estimated by calibrating the transformations $\vec{f}$ and $\vec{g}$, alternatively calibrating one of $\vec{f}$ or $\vec{g}$ and determining the mapping between the two color images $\vec{f} \cdot \vec{g}^{-1}$ or $\vec{g} \cdot \vec{f}^{-1}$.

The mapping calibration employs the positioning of individual fluorescent objects at specific points inside the region of interest with sub-nanometer precision. Direct feedback control of the position of individual fluorescent objects provides accurate and precise sample positioning. Active stabilization of the imaging optics 106 (FIG. 2) is used to maintain the registry between the two colors. This compensates for thermal drift and material creep of the optical mounts of the imaging optics 106.

Figure 5:
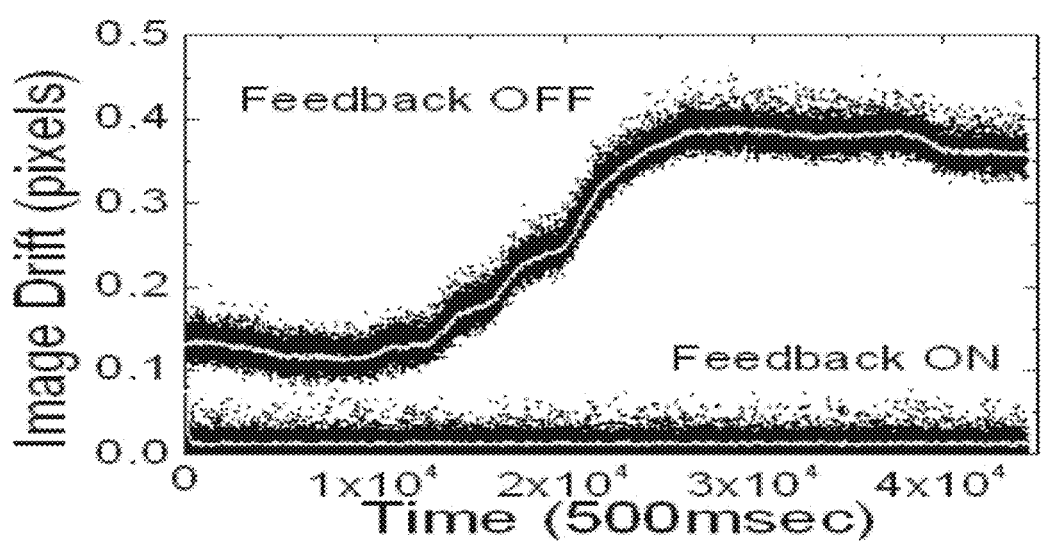
FIG. 5 provides a graph of registration of two colors with feedback off and feedback on where the latter shows registration to <0.01 pixels in an embodiment of a microscope of the present invention.

The drift of the imaging optics 106 was measured by projecting the point source of light (e.g., a pinhole) from the fiducial light source 108 onto both the red and green image frames of the CCD array 220. The bright fiducial mark allowed tracking with very high precision (~0.003 pixels rms). This signal was used to actively stabilize the positions of the pinhole in each image frame with a feedback loop implemented in software that controlled a set of custom-made tip-tilt piezoelectric flexure mounted mirrors, 210 and 212. This scheme maintained <0.01 pixels registration of the two colors over several hours as shown in FIG. 5. The magnification of the optical system was calibrated using the piezo translation stage 312 equipped with capacitive position sensors calibrated in the factory using an interferometer with sub-nanometer accuracy and corrected for non-linearity to 0.01%. The magnification was 64 nm/pixel, translating to <0.64 nm long-term image registration stability.

Figure 6:
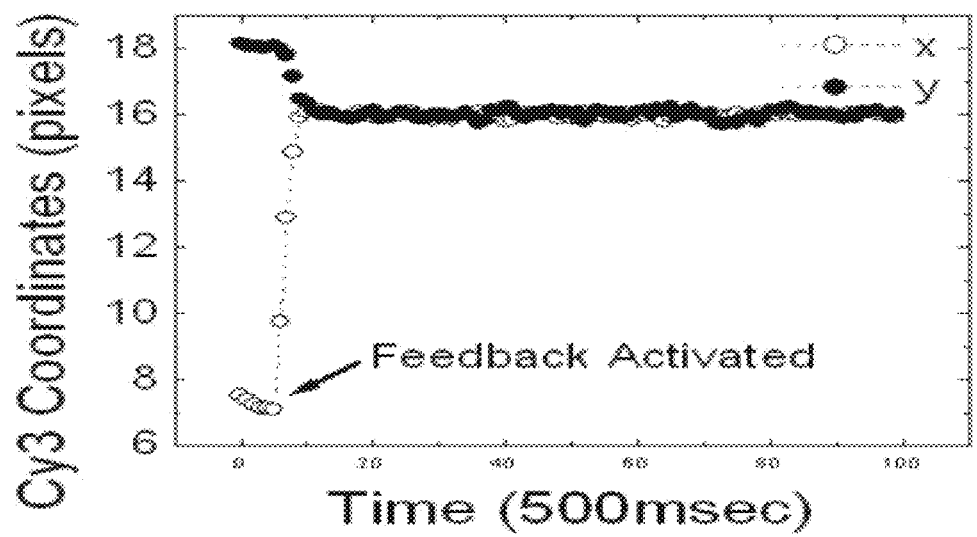
FIG. 6 provides a graph that shows locking of a Cy3 marker within ~4 frames of detection in an embodiment of a microscope of the present invention.
Figure 7:
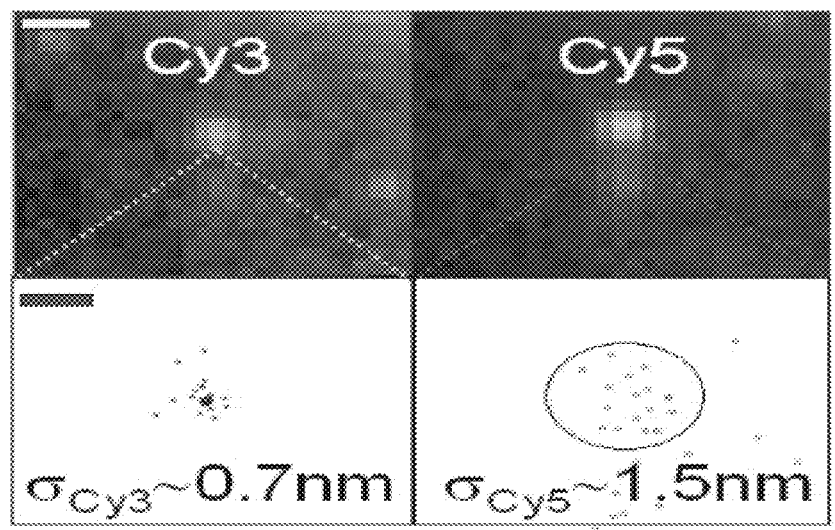
FIG. 7 provides images of Cy3 and Cy5 markers in top panels and locations of locked positions of the Cy3 and Cy5 markers in bottom panels that were imaged in an embodiment of a microscope of the present invention.

A fluorescent object is placed at any desired position on the image frames by measuring in real-time the coordinates ($\vec{x}_{green}$ or $\vec{x}_{red}$) on the CCD array 220 and controlling the sample position $\vec{x}_{sample}$ with the 3D piezo translation stage 312 to lock $\vec{x}_{green}$ or $\vec{x}_{red}$ to the desired set-point. Since the apparent width of the 2D Gaussian peaks depends on the axial-position of the sample, the focus was also actively stabilized (albeit with ~5-fold smaller sensitivity than in xy). This procedure was validated by controlling the position of ~100 nm fluorescent beads as well as single Cy3molecules. Once detected on the CCD array 220, a Cy3 molecule can be locked within ~4 frames (2 seconds) and kept to the same position until it photo-bleaches as shown in FIG. 6. This allows sampling multiple frames and allows enough photons to be collected for sub-nanometer localization precision. For Cy3 at 500 msec exposures a few thousand photons were collected to get ~2-3 nm localization precision in each 2D Gaussian fit. Averaging >10 frames (5 sec), the statistical error in the position of the dye molecule is <1 nm. Moreover, by locking several individual Cy3 molecules at the same position we demonstrate ~0.7 nm molecule-to-molecule reproducibility as shown in FIG. 7.

The form of the mapping function between the two color images was examined using the microscope 300. A fluorescent bead was locked at positions spaced by 0.5 pixels=32 nm. The green image was used for feedback control and 40 frames on each grid point were averaged to reduce the statistical error to a few Å. At the same time the position of the bead in the red channel was measured resulting in 900 pairs of positions $\{\vec{x}_{green}^{i}, \vec{x}_{red}^{i}\} \equiv \{(x_{green}^{i}, y_{green}^{i}), (x_{red}^{i}, y_{red}^{i})\}$ on a 30×30 grid spanning an area of 15×15 pixels$^2$.

Figure 8A:
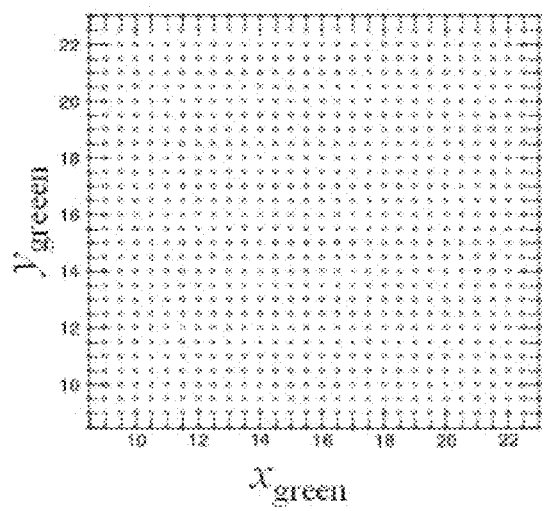
FIGS. 8A and 8B illustrates mapping of green and red channels using a fluorescent bead as an emission source in an embodiment of a microscope of the present invention.
Figure 8B:
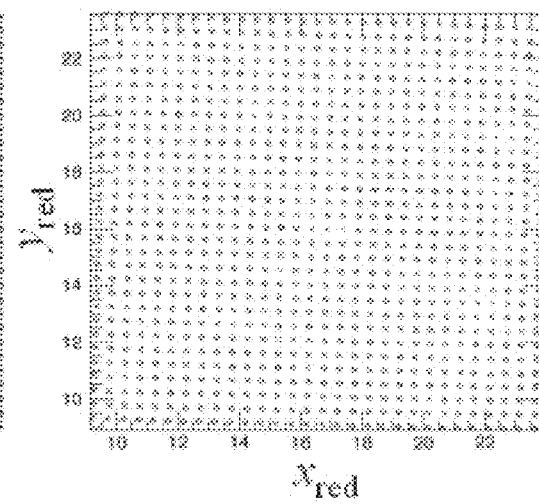

FIGS. 8A and 8B show the mapping of the green and red channels, respectively. In FIG. 8A, marks show the positions $(x_{green}^{i}, y_{green}^{i})$ where the fluorescent bead in the green image was sequentially locked using feedback control on a 30×30 square grid with the 0.5 pixels spacing. In FIG. 8B, marks show the positions of the bead simultaneously appearing in the red image at $(x_{red}^{i}, y_{red}^{i})$ as well as mapped positions of the bead from green image at $(\vec{g} \cdot \vec{f}^{-1})(x_{green}^{i}, y_{green}^{i})$. The mapped positions of the bead from the green image were determined by a linear mapping from the green channel to the red channel using the pairs $\{x_{green}^{i}, y_{green}^{i}), (x_{red}^{i}, y_{red}^{i})\}$. In FIG. 8B, the marks appear slightly smaller or larger depending upon whether the mapped positions of the bead from the green image to the red image align more or less closely, respectively.

Figure 9:
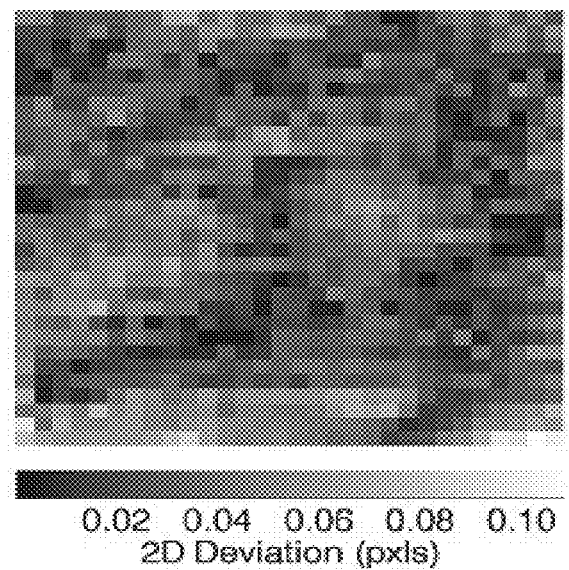
FIG. 9 provides non-linear deviations for mapping of green to red images using a fluorescent bead as an emission source in an embodiment of a microscope of the present invention.

Calibrating the mapping $\vec{g} \cdot \vec{f}^{-1}$ from green to red using linear regression and plotting the 2D map of the absolute deviation $\|(\vec{g} \cdot \vec{f}^{-1})(\vec{x}_{green}^{i}) - \vec{x}_{red}^{i}\|$ reveals non-linear deviations as large as 5-6 nm on the scale of ~5 pixels as shown in FIG. 9

The non-trivial form of the mapping function reflects geometric and chromatic aberrations present in the imaging system as well as sources of image distortion including defects/dirt on the optics and in-homogeneity of the CCD array 220. In particular calibration of the inter-pixel PRNU (photo-response non-uniformity) of the CCD array 220 can in part account for similar spatial features on the mapping functions, which is discussed more fully below. This leads to the conjecture that nanometer variability on the few pixels scale is present in most CCD-based imaging systems.

The non-linear deviations shown in FIG. 9 also demonstrate that just overlaying the two-color images (e.g. calibrating only $\vec{g} \cdot \vec{f}^{-1}$ and implicitly assuming that $\vec{f}$ and $\vec{g}$ are linear and equal to the magnification of the images) is inherently flawed, which is discussed more fully below. In general in order to obtain an accurate calibration, $\vec{f}$ and/or $\vec{g}$ have to be measured directly. Alternatively, one has to either correct the non-linearity explicitly or maintain a center of the 2D Gaussian within a small region of an image frame (e.g. ~1 pixel) inside which a linear approximation is valid.

The spatial profile of the mapping functions is determined by a convolution of the CCD PRNU by the PSF (point spread function). Such a convolution indicates that an error function for the location of a center of the PSF depends mostly upon inhomogeneity of the CCD array 220 on an order of the standard deviation width σ of the PSF. This is discussed more fully below under the heading of, "Effect of CCD PRNU on localization accuracy." For the CCD array 220 employed here, the width σ of the PSF was ~8 pixels. Thus although the inter pixel CCD PRNU causes non-linearity at scales of several pixels, $\vec{f}$ and $\vec{g}$ vary little at scales where a center of the 2D Gaussian is maintained within 1 pixel for the CCD array 220 employed here, provided that there is no significant intra-pixel PRNU.

Significant intra-pixel PRNU is expected for front-illuminated CCD arrays, because the light interacts with a lithographic electrode structure at the edges of each pixel. For a back-illuminated CCD array of the type used here, most of the visible light is absorbed in the silicon chip before it reaches the front surface. Moreover the inter-pixel PRNU calibration shows that most variability is on the ~5 pixel scale, which is believed to be due to defects on the silicon back surface that are produced during fabrication. This suggests reduced variation at sub-pixel scales.

Figure 10A:
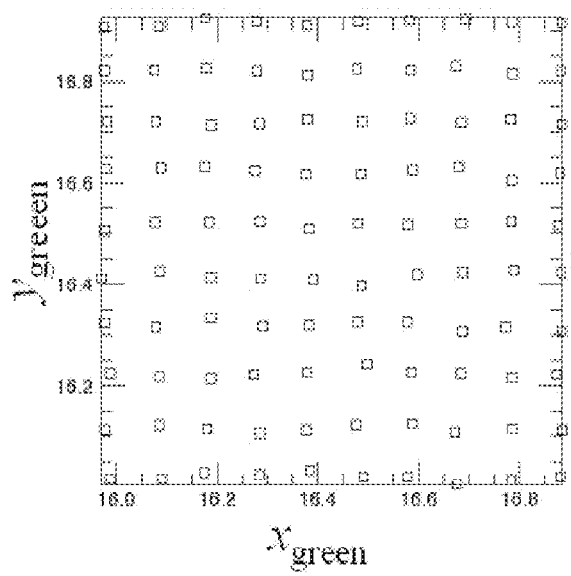
FIGS. 10A and 10B illustrated mapping of green and red channels within a single pixel using a fluorescent bead as an emission source in an embodiment of a microscope of the present invention.
Figure 10B:
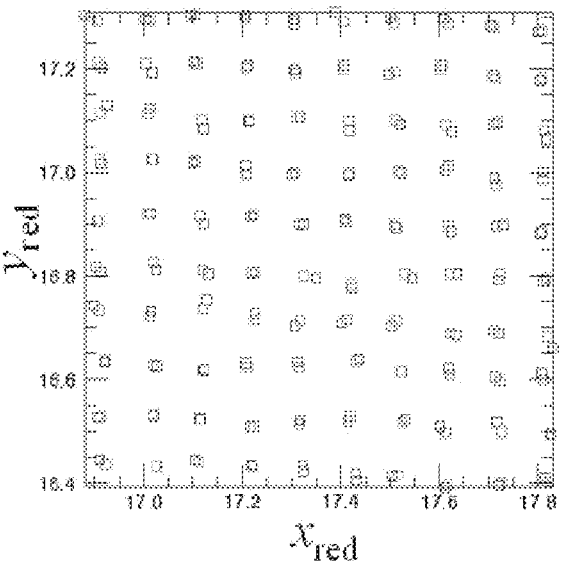
Figure 11:
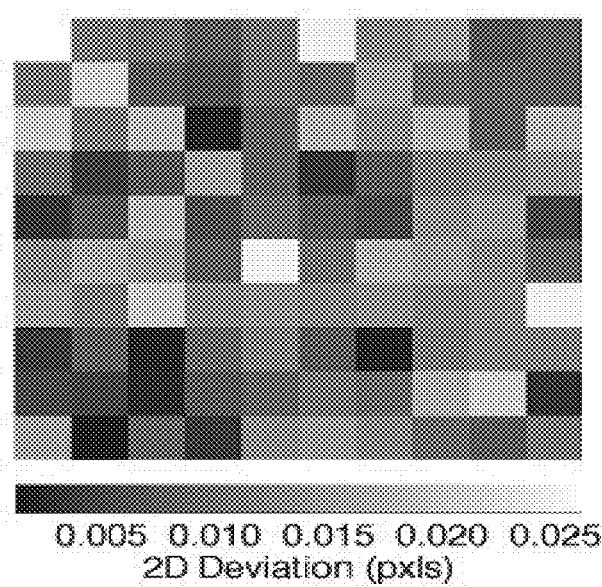
FIG. 11 provides a map of the absolute 2D deviation found in mapping from a green channel to a red channel in an embodiment of a microscope of the present invention.

Inside a region of ~1 pixel, linear functions given by $\vec{x}_{green} = \underline{M}^G \vec{x}_{sample}$+const and $\vec{x}_{red} = \underline{M}^R \vec{x}_{sample}$+const, where the matrices $\underline{M}^G$ and $\underline{M}^R$ are the magnification in the green and red images, were shown to provide 0.5 nm accuracy. FIGS. 10A and 10B show the mapping of the green and red channels, respectively, for the region of ~1 pixel. In FIG. 10A, symbols show the positions $(x_{green}^{i}, y_{green}^{i})$ where the fluorescent bead in the green images was locked on a 10×10 square grid with spacing of 0.1 pixels, averaging 40 frames in each grid point. In FIG. 10B, symbols show the position of the bead appearing in the red image at $(x_{red}^{i}, y_{red}^{i})$ as well as mapped position of the bead from the green image at $(\vec{g} \cdot \vec{f}^{-1})(x_{green}^{i}, y_{green}^{i})$. FIG. 11 shows a map of the absolute 2D deviation in which the typical 2D deviation is 0.68 nm and the standard deviation in each axis is 0.5 nm. The mapping $\vec{x}_{red} = \vec{g} \cdot \vec{f}^{-1} \vec{x}_{green} = \underline{M}^R (\underline{M}^G)^{-1} \vec{x}_{green}$+const from one color to the other is also linear. We note that a larger mapping dynamic range, up to the entire field of view, may be obtained by tiling such individually calibrated regions. Furthermore, although 0.5 nm accuracy is adequate for many applications, the non-linear $\vec{f}$ and $\vec{g}$ mapping functions can be directly calibrated to account for intra-pixel PRNU, in the presence of instrumental drift and noise, with ~Ångstrom precision.

To determine whether the bead calibration is valid for measurements using Cy3 and Cy5, multiple fluorescent beads were used to calibrate the 1 pixel$^2$ area. It was observed that although the linear mapping coefficients are consistent to 1-2%, nominally identical beads can produce systematic offset errors of a few rim, which is discussed more fully below under the heading of, "Linear mapping calibration using fluorescent beads."

A second independent calibration of the mapping function in the same region was performed using individual Cy3 and Cy5 molecules spaced by 20 bp on a DNA duplex that was attached to the surface by a flexible single-stranded linker. The position $\vec{x}_{green}$ of Cy3 was locked and the position $\vec{x}_{red}$ of the Cy5 was measured. Reproducibility between individual molecules of 1.5 nm was found as shown in FIG. 7. This is superior to reproducibility with the fluorescent beads, which is believed to be due to variations in the distribution of fluorescence material in each bead. For these tests, the Cy3-Cy5 duplex that was used to calibrate the mapping function employed N~10 molecules at each calibration point and the values of the linear coefficients obtained with beads were verified to ~2%. Sub-nanometer accuracy was obtained for the constant offset terms, which is discussed more fully below under the heading of, "Calibration of mapping function g·f$^1$ using Cy3 and Cy5 attached to 20 bp DNA complex."

To test the improvement of the sub-nanometer accurate mapping calibration, Cy3 and Cy5 were attached to the ends of short DNA duplexes of known length. In experiments where the DNA molecule was immobilized to the surface on both ends, the dye molecules stuck to the DNA or the surface and asymmetric emission patterns were observed. The asymmetry of the Cy3 and Cy5 images causes in our case 5-10 nm localization errors. The best resolution was achieved with freely rotating dyes that appeared as isotropic emitters, which was the case for DNA tethered on one end only and stretched away from the surface, which is discussed more fully below.

Figure 12:
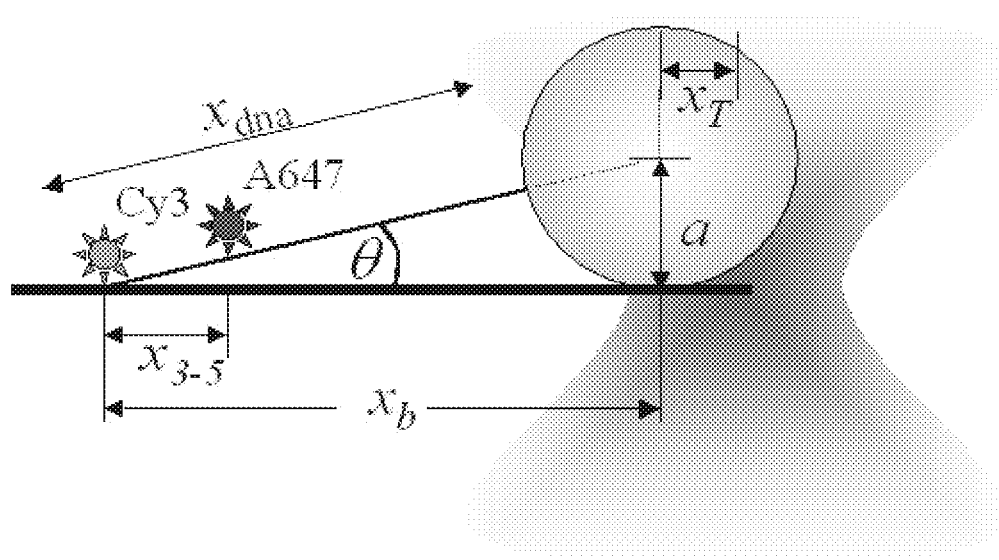
FIG. 12 illustrates a sample arrangement used in an embodiment of a microscope of the present invention.

FIG. 12 illustrates a sample arrangement 1200 in which an end of a DNA molecule 1202 is attached to a surface 1204 and the other end is held in an optical trap 1206 to suppress Brownian motion and to maintain the DNA molecule in a fixed position and orientation in the solution while also keeping dye markers away from the surface to avoid non-specific interactions with the surface. For simultaneous trapping and single molecule fluorescence imaging, 1.6 kb dsDNA constructs were prepared that contained a Cy3 dye near the surface immobilized end of the DNA and an Alexa647 dye attached partway along a length of the DNA. The free end of the DNA was attached to a 0.5 µm diameter polystyrene microsphere 1208. The image of the Cy3 dye in the green channel was used to clamp the position of the tethering point of the DNA to a specific pixel on the CCD array 220. The center of the trap was held staiionary 950 nm away from the tethering point in the positive x-direction. Active control of the trap was not needed to keep the trap fixed with respect to the tethering point since temperature stability of <0.5 C peak-to-peak in the room kept instrumental drift to at most a few nm over several hours, causing a negligible change in the geometry. The trapping beam intensity remained constant to within a few percent at 400 mW during the measurements, which created a trap stiffness $k_T$=0.05±0.006 pN/nm.

With the trap activated and the Cy3 position locked at the set-point, each DNA-tethered microsphere was measured to be 187 nm away from the trap center, with reproducibility <10 nm perhaps due to the polydispersity of the linkers to the surface and to the microsphere. A force 9.3±1.0 pN was estimated from the trap stiffness and a fractional extension of 96.7(±2)% for the ~1.6 kb dsDNA tethers was estimated from the geometry. Simultaneously, the position of the Alexa647 was measured in the red images and the mapping calibration was used to estimate its distance from the Cy3.

Figure 13:
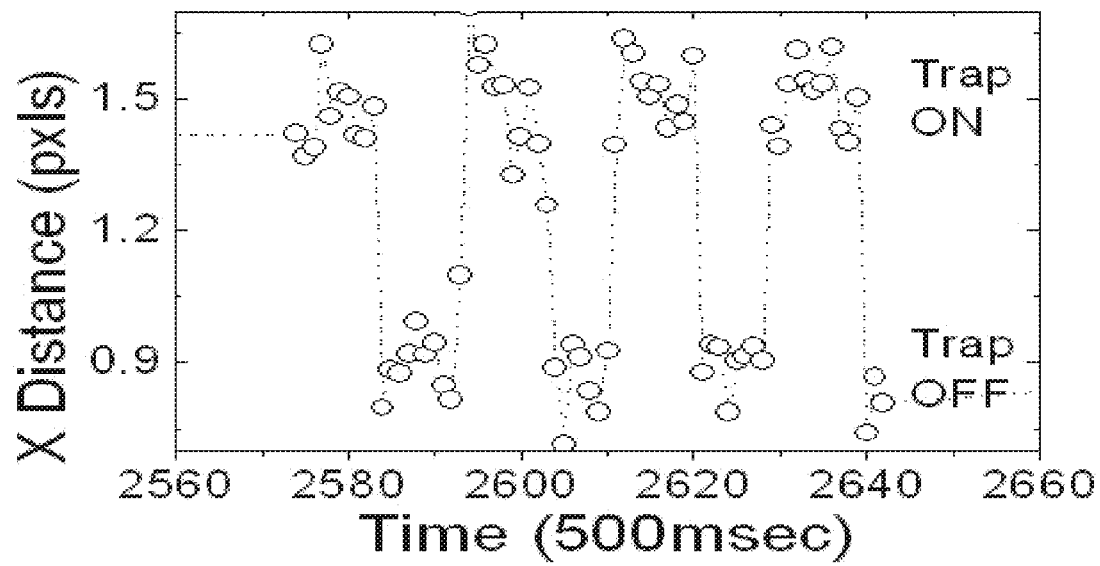
FIG. 13 provides a distance trace between Cy3 and Alexa647 markers located along a DNA molecule that was imaged in an embodiment of a microscope of the present invention.

FIG. 13 shows a Cy3-Alexa647 distance trace from a single molecule. The dyes were separated by 125 bp along the DNA molecule. The distance between the dyes along the x direction followed a periodic switching of the optical trap.

Figure 14:
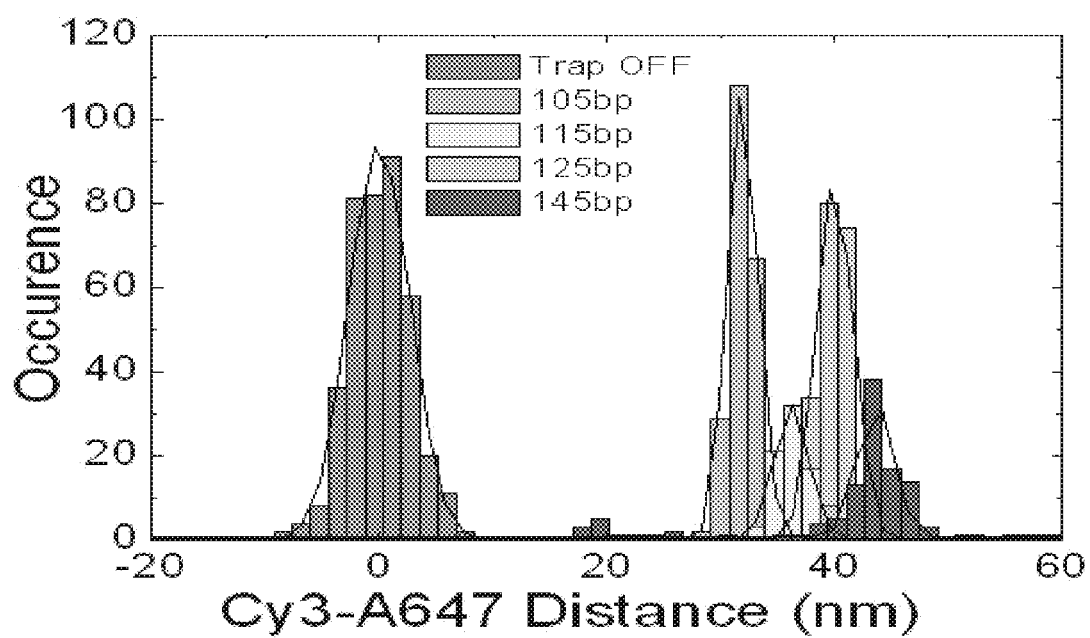
FIG. 14 provides results of varying Cy3-Alexa647 spacing on various DNA molecules that were imaged in an embodiment of a microscope of the present invention.

FIG. 14 provides results of varying Cy3-Alexa647 spacing (105 bp, 115 bp, 125 bp and 145 bp), which shows that distance differences as small as ~3 nm (10 bp) can be resolved. The precision of these measurements (i.e. the ability to resolve changes) is determined by the number of collected photons (i.e. collecting more photons improves the precision). Tracking a single molecule open-loop allows ~$10^4$ collected photons in ~1 sec and the uncertainty is ~1.5 nm. Here, the feedback control system allows collecting an arbitrary number of photons while locking a single molecule at a fixed position. For N≈10 molecules and ~$10^6$ collected photons the statistical uncertainty, given by the error in the mean in each Cy3-Alexa647 distance measured, becomes 0.2 nm. Thus the method here allows determining differences with atomic-scale resolution.

Figure 15:
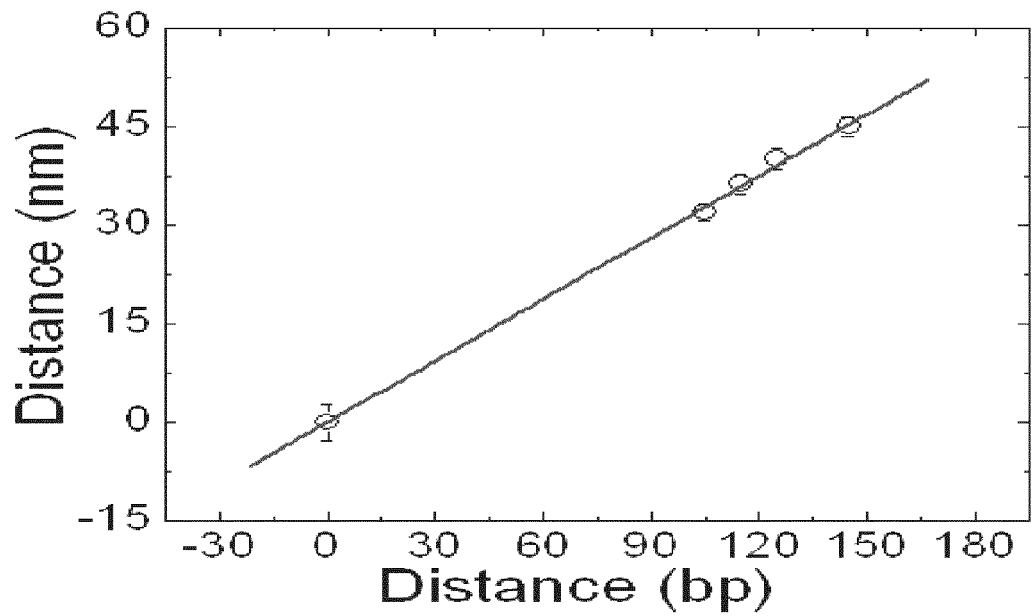
FIG. 15 provides a graph of various partial lengths of DNA in by versus measured distance that were imaged in an embodiment of a microscope of the present invention.

FIG. 15 shows distance for various partial lengths of DNA in by versus measured distance in nm. The accuracy of the measurements here, folding in systematic errors and indicating how close the measured distances are to the real distances, is given by the typical deviation from linearity, which is 0.72 nm. The statistical error for each Cy3-A647 distance measurement is estimated as $$error = \frac{sigma}{\sqrt{N_{total}/N_{average}}},$$

where sigma is the standard deviation of each Gaussian peak, $N_{total}$ is the total counts in each peak, and $N_{average}$=9 is the number of consecutive frames box-car averaged in each trace. Table 1 provides results of measurements of partial lengths of DNA.

TABLE 1

Fitting parameters for Cy3-A647 distance distributions

| Cy3-A647 spacing (bp) | Peak position (nm) | Dev. from linearity (nm) | Sigma (nm) | $N_{total}$ | Error (nm) |
|---|---|---|---|---|---|
| 0 | 0 | 0 | 2.67 | 395 | 0.40 |
| 105 | 32.10 | −0.65 | 1.32 | 233 | 0.26 |
| 115 | 36.39 | +0.51 | 1.3 | 86 | 0.42 |
| 125 | 39.85 | +0.85 | 1.17 | 251 | 0.22 |
| 145 | 44.86 | −0.37 | 1.66 | 132 | 0.43 |

The methodology here can be applied to measure the positions of DNA-binding proteins or hybridization probes on target DNA sequences, providing the most accurate fingerprinting of single molecules and perhaps obtaining sequence information from single molecules. The methodology here can also be applied to measure the structure and dynamics of multi-subunit complexes involved in processes such as Transcription Initiation, DNA Replication and Repair and Chromatin Remodeling, in real-time, at the single-molecule level and with unprecedented resolution.

Measurements of 3D distances may be accomplished through attachment of bio-molecules stereo-specifically to a surface, imaging of dye markers attached to the molecules (i.e. determining locations of the markers in x- and y-coordinates by 2D Gaussian fitting as discussed above), and determining axial location of the dye markers (i.e. location of the dye markers in the z-coordinate). Attachment of a bio-molecule may be accomplished using multiple linkages from the sample to a support. Attachment can be through chemical cross-linking, biotin-streptavidin interactions, antibody-antigen interactions, or other suitable techniques. Here, measurements of the z-coordinate were estimated using a calibration of the width of the Gaussian peak versus axial focus position. Alternatively, the z-coordinate can be estimated by analyzing images using a centroid algorithm or a pattern matching algorithm. The pattern matching algorithm can also be used to analyze out-of-focus images of fixed dipoles and thus estimate both the position and orientation of anisotropic emitters. Other alternative techniques for determining the z-coordinate include employing out-of-focus imaging by calibrating the diameter of the diffraction rings of the image versus axial focus position, introducing an astigmatism with a weak-cylindrical lens and calibrating the ellipticity of the PSF versus focus position, and determining the position of the fluorescent probe in the first standing wave maximum of a 4π interferometric microscope. An embodiment of a 4π interferometric microscope of the present invention is discussed more fully below under the heading of, "Other embodiments."

On the other hand, to take advantage of superior resolution in the imaging plane, trapping (e.g., optical trapping), possibly with the addition of angular manipulation, could allow taking 2D projections of quasi-static 3D structures at variable angles and recover 3D distances by triangulation. In addition ~1-2 nanometer co-localization of different color fluorescent probes tagging molecules inside cells might be possible provided they are attached to a rigid underlying cellular structure. Another interesting possibility is combining the work here with sub-diffraction imaging methods that achieve PSFs smaller that λ/2 in an attempt to get even better resolution. Finally the methodology presented here might be of value in astronomical imaging and photometry of closely spaced but spectrally distinct stellar objects. A detailed mapping of the non-linear CCD response using a bright astronomical object can also be used to construct a mapping function that can be used to make subtle distortion corrections in the imaging of extended objects such as galaxies. These corrections may be useful in the data analysis of large area surveys of galaxy shapes distorted by weak gravitational lensing due to dark matter.

Methods

Fluorescent beads were obtained from Molecular probes (100 nm red fluorescent beads, emission maximum at 605 nm). DNA oligonucleotides modified at the 5'-end with Cy3, Cy5, biotin and digoxigenin and internally with a biotin-modified Thymine base were synthesized and HPLC purified by Integrated DNA Technologies. An internally labeled oligo with Alexa-647 dye was synthesized and gel-purified by GeneLink Technologies. The Alexa-647 dye was attached with a carbon-chain linker to a modified Thymine base.

The Cy3-Cy5 short duplexes used in the experiments were prepared by annealing the two complementary strands at 2 µM in 20 mM Tris-HCl pH=7.9 50 mM NaCl buffer at 95° C. for ~15 min followed by cooling to room temperature over ~2-3 hrs.

The ~1.6 kb Cy3-Alexa647 constructs were prepared by PCR from a plasmid template containing the Thermus Aquaticus rpoC gene. A ~1.5 kb fragment was prepared with the 5'-digoxigenin primer and the Alexa-647 primer. The Alexa-647 primer contained an EcoRI site at its 5'-end. A set of 4 fragments 100-150 bp long was prepared with the 5'-Cy3/+3 bp biotin dT primer and 4 different primers with an EcoRI site. After digestion with EcoRI (New England Biolabs) and subsequent ligation (Roche Rapid Ligation Kit) of the each short fragment with the long fragment we obtain 4 DNA constructs with 5'-Cy3 on one end, a biotin-dT at 3 bp away from the Cy3 end, an internal Alexa-647 at 105 bp, 115 bp, 125 bp and 145 bp away from the Cy3 and a 5'-digoxigenin at the other end. Ligation efficiency and correct product length were confirmed with agarose gel electrophoresis. All the enzymatic reactions were cleaned-up using a kit from QIAGEN.

Figure 16:
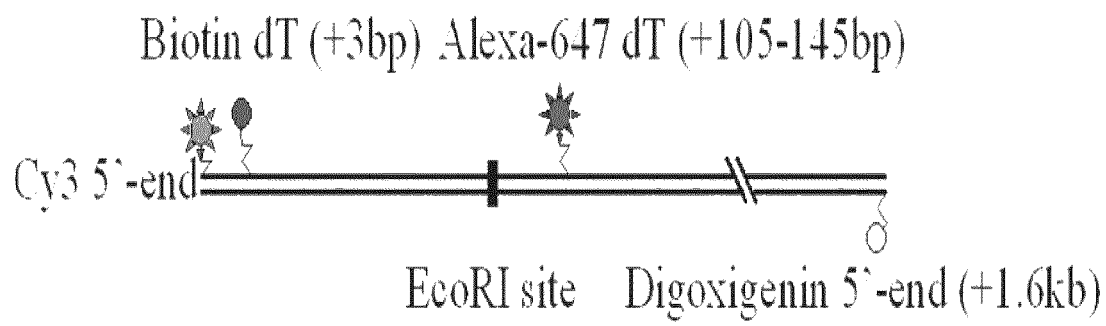
FIG. 16 illustrates a design of a DNA construct that was imaged in an embodiment of a microscope of the present invention.
Figure 17:
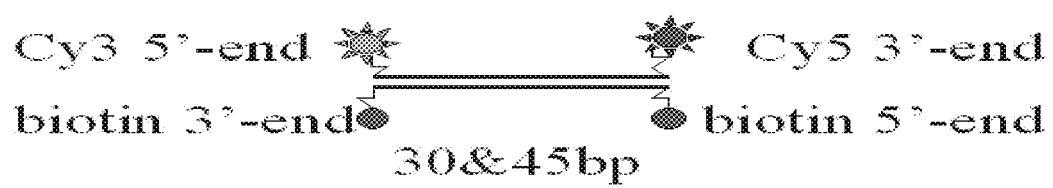
FIG. 17 illustrates another design of a DNA construct that was imaged in an embodiment of a microscope of the present invention.
Figure 18:
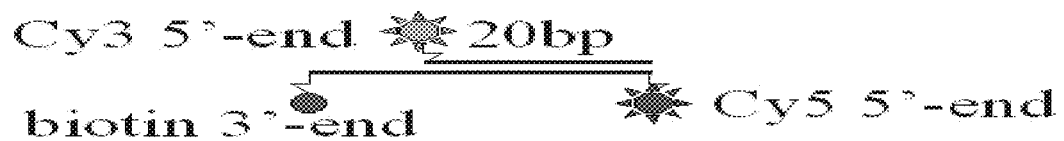
FIG. 18 illustrates yet another design of a DNA construct that was imaged in an embodiment of a microscope of the present invention.

FIG. 16 shows a design of a DNA construct 1600 that was extended using optical trapping, where Cy3 is located proximately to an end and Alexa647 is located along the length. FIG. 17 shows a design of a DNA construct 1700 that was immobilized to a streptavidin surface at both ends. FIG. 18 shows a design of a DNA construct 1800 that was attached only on one end and where Cy3-Cy5 separation is 20 bp and attachment to a surface is through a poly-A single-stranded linker.

Experimental sample cells were assembled using a PEG-coated glass coverslip and a PEG-coated glass slide with ~100 µm thick double-sticky tape as a spacer and 5-minute epoxy. The glass surfaces were first cleaned in a 0.5M KOH solution, sonicated in deionized water and dried in a Nitrogen stream. Then they were functionalized with amine groups by immersing in a 3% v/v solution of 3-aminopropyltriethoxysilane (Sigma, 3-APTES) in acetone for ~15 minutes. Amine-reactive Polyethylene glycol (NEKTAR, mPEG-SPA 5 kDa and biotin-PEG-NHS 3.4 kDa, 50:1 ratio) was coupled to the surfaces in a 10% w/v "clouding-point" solution (S1) of 0.1 M $NaHCO_3$ and 0.4M $K_2SO_4$ for ~30 minutes at room temperature. For experiments with DNA duplexes labeled with biotin on both ends instead of kDa-sized PEG we grafted a shorter Polyethylene-oxide polymer (Pierce, NHS-$PEO_4$-biotin) to get dense biotin coverage on the surface.

For optical trapping experiments, 0.5 µm diameter aliphatic amine polystyrene spheres (IDC) was modified with Traut's reagent (Pierce) to introduce thiols on the surface and bi-functional PEG (NEKTAR, NHS-PEG-Maleimide 3.4 kDa) was grafted to the beads in PBS pH=7.4 buffer. The beads were functionalized by covalent attachment trough primary amines of an antibody to digoxigenin (Roche) in 0.1M $NaHCO_3$, washed and stored in PBS at 4° C.

Assembled sample cells were incubated with a 10% w/v solution of Bovine-serum-albumin (EMD Biosciences, BSA fraction V) in PBS pH=7.4 buffer for ~1 hr to block any sites of non-specific interaction on the surface, rinsed with PBS, incubated with a 50 µg/mL streptavidin (Molecular Probes) solution in PBS for ~15 mM, rinsed with PBS, and incubated with DNA molecules diluted to 2-20 µM for ~15 min to get roughly 1 molecule per several µm². For experiments with optical trapping, a ~0.1% v/v solution of beads was incubated in the cell for ~30 min. After the cells were rinsed, oxygen-scavenging imaging buffer was introduced and the samples were sealed to prevent oxygen diffusion in the solution.

Oxygen-scavenging imaging buffer was 100 mM HEPES-KOH pH=7.5, 160 mM KCl, 0.9% w/v Glucose, 2 mM Trolox (Sigma), 1× Glucose-oxidase/catalase enzyme stock, 1.4 mM (nucleotides) polydG-dC (Amersham) and 0.2% w/v BSA. Glucose-oxidase/catalase stock was prepared as described in (S2). Trolox was prepared as a 200 mM stock in DMSO and was used to reduce blinking of the Cy5 (S3).

The composition of the imaging buffer was essential for achieving stable, oxygen free conditions in the sample cell for up to ~1 day to allow uninterrupted data collection. Concentration of HEPES≤50 mM results in inefficient buffering capacity and pH drops below 6, presumably due to gluconic acid accumulation due to the enzymatic action of glucose oxidase. Moreover, within a few hours from the initial imaging buffer injection the beads/DNA tethers begin to stick to the surface if non-specific DNA and protein competitors are omitted from the solution.

Setup

The actively stabilized two-color single molecule fluorescence setup (i.e., the microscope 300 of FIG. 3) was build around an inverted optical microscope (Olympus, IX-71). Fluorescence excitation of Cy3 and Cy5 was produced using a green 532 nm solid-state laser (Crystalaser) and a red 635 nm diode laser (Thorlabs), which were delivered to the microscope through single-mode optical fibers. Optical trapping was performed using a 1064 nm NIR Nd:$YVO_4$ solid state CW laser (Coherent, Compass 2500MN). The laser beams were combined using dichroic mirrors (Chroma) and delivered to the microscope with a poly-chroic mirror 315 (z532-633-780-1064rdc, Chroma) that reflected all laser beams but allowed transmission of emitted fluorescence. An oil immersion (Nikon 60×NA=1.49) objective lens 302 was used for TIR excitation, fluorescence imaging and optical trapping.

The forward scattered trapping beam was collected with a condenser lens 314 and the back-focal plane of the condenser was imaged on a quadrant photo-detector 316 to track the position of the trapped bead. The X,Y and Sum signals from the photo-detector were acquired for processing either with a spectrum analyzer (Stanford Research Systems) or with a 16-bit Data Acquisition board (National Instruments), installed in a PC.

The blue LED 326 (Thorlabs, 455 nm emission peak) facilitated simultaneous bright field-fluorescence imaging. The image on the side port of the microscope was split with a long-pass dichroic 346 (Omega, 505DCLP) and the blue light was projected with relay lenses on a fast-CCD array 317 (Andor, DV860DCS-BV). The fluorescence image was further magnified with a pair of achromatic lenses (Thorlabs), combined with the image of a pinhole from the fiducial light source 108 (FIG. 2) (that acted as a bright fiduciary mark to stabilized the two-color imaging optics) with a 95:5 partial mirror 224 and collimated with a f=5 cm achromatic lens 204. The collimated light was split into two separate paths, 232 and 234, by a long-pass dichroic mirror 208 with extended reflection (Chroma, 645DCXR), band-pass filters, 214 and 216, selected Cy3 and Cy5emission (Chroma, HQ570/50 and HQ700/100) and projected onto the CCD array 220 (Andor, DV897CSO-BV) with a f=5 cm imaging lens 218. A pair of homemade piezoelectric tip/tilt flexure mounted mirrors, 210 and 212, was used to independently adjust the position of each color image on the CCD array 220.

A 3-axis closed-loop piezoelectric stage 312 (FIG. 3) (Physik Instrumente, 561-3DD) equipped with capacitive position sensors was used to control the position of the sample 356. The stage was calibrated in the factory to sub-nanometer accuracy with a laser interferometer and the non-linearity of the capacitive sensors was corrected to 0.01% with a digital controller (Physik Instrumente E-710).

Data acquisition and instrument control were performed with software written in LabVIEW (National Instruments). Off-line data analysis was performed in IDL (Research Systems Inc).

The sensitivity of the quadrant photo-detector was calibrated by raster scanning the piezo stage 312 with microspheres stuck on the coverglass, and was found to be 2.5±0.25 mV/nm. The trap stiffness $k_T$ was calibrated using the equi-partition theorem and was found to depend linearly on the laser power. For the power used here, $k_T$=0.050±0.006 pN/nm.

During combined optical trapping/single molecule fluorescence imaging it is known that absorption of a near IR photon during the excited state lifetime of certain cyanine dyes (Cy3 and Alexa-555) can cause irreversible photo-destruction. Since the excited state lifetime of Cy3 is ~nsec while relevant experimental time scales are ~msec or longer a straightforward way to circumvent this problem is alternating the excitation and trapping beams. However, chopping at frequencies close to the viscous relaxation time of the microsphere can compromise the performance of the trap and increase position noise. An RF signal from a Voltage-controlled Oscillator 348 drives both the 532 nm and 1064 nm acousto-optic deflectors 340 (Isomet, 1205-C), while an RF switch 352 (Mini-Circuits, ZYSWA-2-50DR, 6 ns rise/fall time) alternates between the two. The signal driving the switch is a square wave from a function generator 350 and the RF signal is amplified to ~1 W by the amplifiers 354 to drive the acousto-optic deflectors 340. By also reducing the beam waist (~100 μm) inside the acousto-optic deflectors, the electronics here achieve modulation frequencies up to (at least) 1 MHz, as verified by a fast photodiode 336. Chopping the trapping beam at these frequencies does not result in any adverse effects, other than a 2-fold reduction in the trap stiffness due to the 50% duty cycle. At the same time the enhanced photo-bleaching of the Cy3 is eliminated.

FIG. 19 shows the elimination of Cy3 photo-bleaching where left panels show the fluorescence intensity profiles covering the surface at high density and where right panels show a line scan of the fluorescence through the optical trap. The top panels show enhanced photo-bleaching at the center of the trap when the 1064 nm and 532 nm lasers are on simultaneously. The bottom panels show that this enhanced photo-bleaching effect is eliminated when the lasers are alternated at 1 MHz. The power of the 1064 nm laser was 200 mW while the power of the 532 nm laser was 10 mW and illuminated an area ~50 μm in diameter. The exposure time for each image was 15 sec.

Effect of CCD PRNU on the Localization Accuracy

Consider the image of a Gaussian peak with intensity profile given by $$I(x) = I_0 e^{-\frac{x^2}{2\sigma^2}}$$

as an estimate of the PSF of a fluorescent spot within an image frame of the CCD array 220. The actual image measured by the CCD array 220 is $I(x) \cdot (1+\in(x))$, where $(1+\in(x))$ is the spatial profile of the CCD PRNU. The apparent position of the peak is given by the centroid of the image, $$\langle x \rangle = \int xI(x)(1+\varepsilon(x))dx = \int xI_0 e^{-\frac{x^2}{2\sigma^2}}(1+\varepsilon(x))dx.$$

The peak will be shifted from its initial position due to the PRNU by an amount $$\delta x(\sigma,\varepsilon) =$$
$$\int xI_0 e^{-\frac{x^2}{2\sigma^2}}\varepsilon(x)dx = \int xI_0 e^{-\frac{x^2}{2\sigma^2}} e^{-iqx}\tilde{\varepsilon}(q)dqdx \propto \int (q\sigma)e^{-\frac{(q\sigma)^2}{2}}\tilde{\varepsilon}(q)dq,$$

which is a convolution of the estimate of the PSF and the error function. Thus the effect of each Fourier mode $\tilde{\in}(q)$ of the PRNU on the position of the peak is weighted by the factor $$(q\sigma)e^{-\frac{(q\sigma)^2}{2}},$$

indicating that the largest deviations are created by inhomogeneities of the CCD array 220 on a scale comparable to the width σ of the Gaussian peak, which is shown graphically in FIG. 20.

Figure 21:
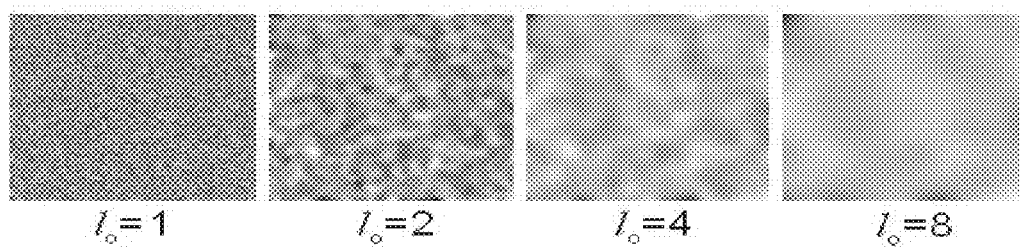
FIG. 21 provides simulated images that were used to theoretically test an effect of PRNU on localization accuracy that is expected in an embodiment of a microscope of the present invention.
Figure 22:
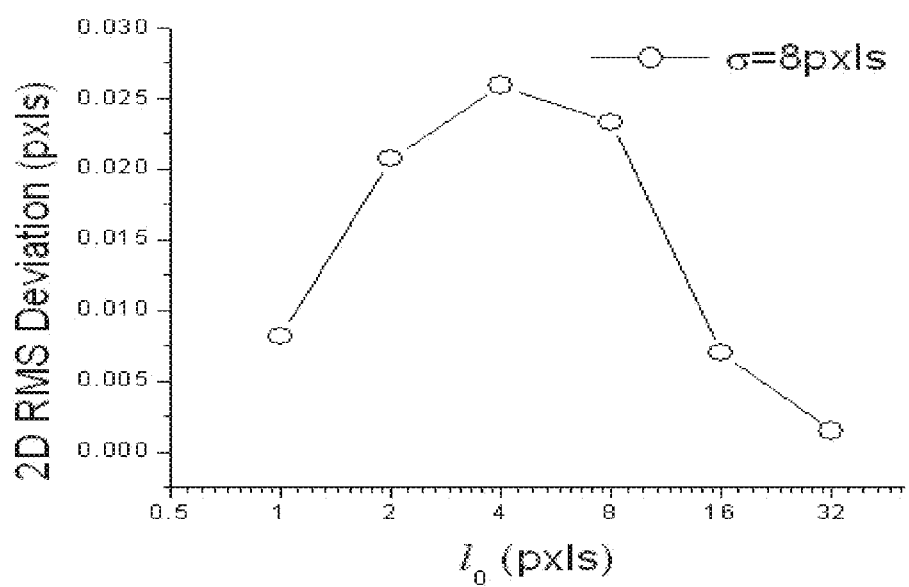
FIG. 22 provides a theoretical RMS deviation of a 2D Gaussian peak of 8 pixels width (i.e. standard deviation width) versus characteristic length scale $l_0$ that is expected in an embodiment of a microscope of the present invention.

The effect of PRNU was tested with the full 2D Gaussian non-linear least-squares fit on simulated images, which are shown in FIG. 21. These simulated images were created by a numerically generated PRNU with variable characteristic length-scales $l_0$=1, 2, 4, and 8 pixels but with fixed standard deviation at 2%. These were multiplied by an ideal 2D Gaussian peak positioned randomly in the field of view with the PRNU and the resulting images were fit to locate the center position of the peak in x, y. FIG. 22 provides RMS deviation of the position of a 2D Gaussian peak with width σ=8 pixels versus characteristic length scale $l_0$, which shows that the largest deviations in the position are observed for characteristic PRNU length-scale comparable to the width of the 2D Gaussian (i.e., $l_0$ on the order of ~2 to 8 pixels), in agreement with the analytical calculation.

Calibration of Inter-Pixel CCD PRNU

Figure 23:
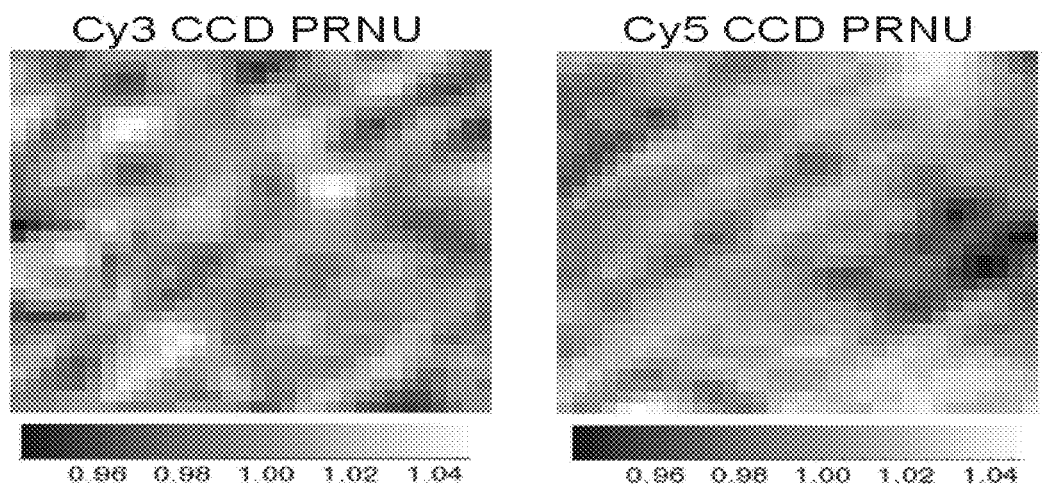
FIG. 23 provides maps of PRNU over 32×32 pixels measured in an embodiment of a microscope of the present invention.

To calibrate the inter-pixel CCD PRNU, the blue LED 326 that is used for illuminating the sample in the microscope was replaced with a white LED and a featureless sample was imaged onto the CCD array 220. Translating the sample in x, y and changing the focus in z did not cause apparent changes of the images produced by the CCD array 220. 800 images were taken of a region of 32×32 pixels with the LED on to measure the response of the CCD array, with signal level in each pixel corresponding to ~$10^4$ photons. 800 images were also taken with the LED off to measure the background. The response of each pixel was measured as the average signal minus the average background. FIG. 23 shows a map of the PRNU. The standard deviation between pixels was about 1.8%.

To calculate the effect of the experimental PRNU on localization and the mapping from the green to the red images, simulated images of 2D Gaussian peaks with width $\sigma_{green}=2.05$ pixels and $\sigma_{red}=2.25$ pixels (corresponding to the measured widths for Cy3 and Cy5) were created. The 2D Gaussian peaks were placed on a 30×30 grid with spacing 0.5 pixels, corresponding to the middle 15×15 pixels of the calibrated region. Each 2D Gaussian peak was multiplied by the measured PRNU and fitted with a non-linear least squares algorithm to return its x-y coordinates. Due to the PRNU, the x, y coordinates from the least-squares fit deviated from the perfect grid positions. For each point, the difference in deviations between the green and red channel were taken to estimate the non-linear part of the mapping function from green to red.

Figure 24:
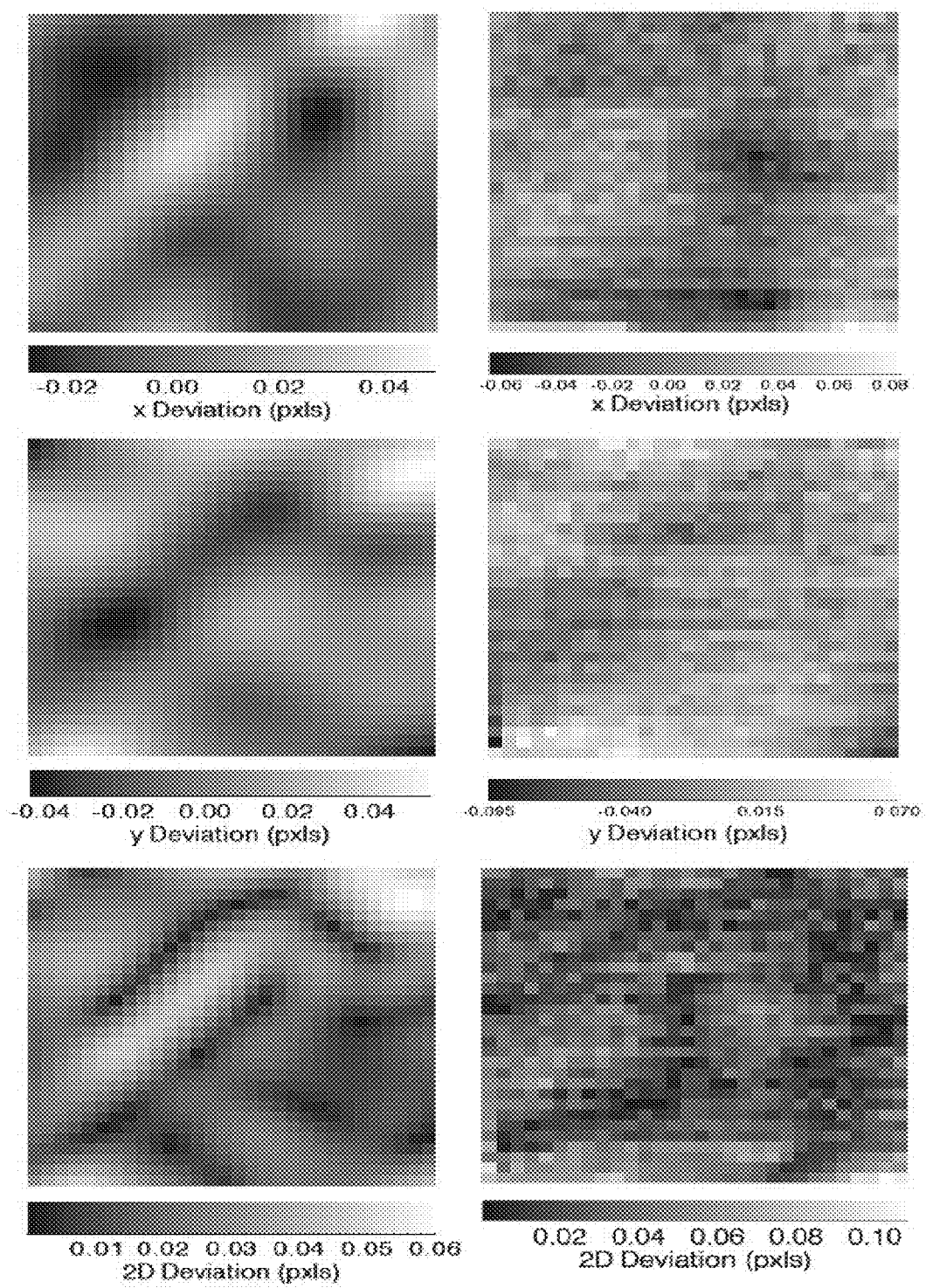
FIG. 24 provides predicted deviations of PRNU from linearity alongside actual deviations for three regions of a CCD array employed in an embodiment of a microscope of the present invention.

FIG. 24 shows the predicted deviations from linearity alongside measured deviations from linearity for three regions of the CCD array 220. The predicted non-linearity due to inter-pixel PRNU are shown in left panels and the measured non-linearity are shown in right panels. As can be seen, the predicted non-linearity shows similar spatial features to the measured non-linearity of fluorescent bead images. Thus the inter-pixel CCD PRNU can account for a large part of the ~nanometer deviations on scale of a few pixels seen experimentally.

Assume two objects are on the sample at positions $x_1$ and $x_2$ and object 1 appears in the green image while object 2 appears on the red image. If one calibrates only the mapping function from green to red images $g \cdot f^1$ and assumes that, for example, g is linear ($g=g_L$ given by only the magnification of the system) then the estimate for the distance between the two objects is $\delta x_L = g_L^{-1}(g \cdot f^1(x_{green}) - x_{red})$. In reality $g=g_L+g_{NL}$ where $g_{NL}$ is the non-linear part. Thus, the true distance is:

$$\delta x = x_1 - x_2 = g^{-1}(g \cdot f^1(x_{green})) - g^{-1}(x_{red})$$
$$= [g_L^{-1}(g \cdot f^1(x_{green})) + g_{NL}^{-1}(g \cdot f^1(x_{green}))] -$$
$$[g_L^{-1}(x_{red}) + g_{NL}^{-1}(x_{red})].$$

The error in the distance estimate due to the $g_{NL}^{-1}$ is $$\delta x_L - \delta x = g_{NL}^{-1}(g \cdot f^1(x_{green})) - g_{NL}^{-1}(x_{red}) \neq 0.$$

Linear Mapping Calibration Using Flourescent Beads

Calibration of the mapping function $g \cdot f^1$ was repeated with 3 different beads. The result for the mapping coefficients is (mean±standard deviation)

$$\begin{pmatrix} x_{red} \\ y_{red} \end{pmatrix} = \begin{pmatrix} 1.000 \pm 0.002 & -0.004 \pm 0.011 \\ -0.036 \pm 0.006 & 0.953 \pm 0.013 \end{pmatrix} \begin{pmatrix} x_{green} \\ y_{green} \end{pmatrix} + \begin{pmatrix} 0.995 \pm 0.195 \\ 1.774 \pm 0.236 \end{pmatrix},$$

showing excellent reproducibility in the linear coefficients but ~0.2 pixels (12 nm) systematic errors in the offset terms. To test the performance of this calibration, for each bead, the positions $x_{green}$ were transformed and the mean deviation $<g \cdot f^1(x_{green}) - x_{red}>$ was calculated. The typical systematic errors due to bead-to-bead variability were 1.1 nm in the X-axis and 1.5 nm in the Y-axis.

Calibration of Mapping Function $g \cdot f^1$ Using CY3 and CY5 Attached to 20 bp DNA Complex Single Cy3 and Cy5 molecules were attached at the ends of the 20 bp DNA duplex to directly to calibrate the mapping functions. One end also contained a biotin moiety and was attached to the streptavidin-coated cover-glass surface. The position $x_{green}$ of Cy3 was locked and the position $x_{red}$ of the Cy5 was measured. The $x_{green}$ set-point was scanned on 9 separate points arranged on a 3×3 grid, spaced by 0.5 pixels to calibrate a square region of size 1 pixel. Since there was variation of ~1.5 nm between individual Cy5 molecules, for each grid point N~10 different DNA duplexes were measured to collect enough data for sub-nanometer localization precision. The linear mapping is $$\begin{pmatrix} x_{red} \\ y_{red} \end{pmatrix} = \begin{pmatrix} 1.002 \pm 0.013 & 0.018 \pm 0.013 \\ -0.058 \pm 0.032 & 0.971 \pm 0.032 \end{pmatrix} \begin{pmatrix} x_{green} \\ y_{green} \end{pmatrix} + \begin{pmatrix} 0.526 \pm 0.004 \\ 1.909 \pm 0.011 \end{pmatrix}.$$

The linear mapping coefficients agree to ~0.02 with the ones obtained with fluorescent beads but the constant terms have errors 0.005-0.01 pixels (0.3-0.6 nm). This mapping function was used for measuring Cy3-Cy5 distances.

Measurement of DNA End-to-End Extension

Figure 25:
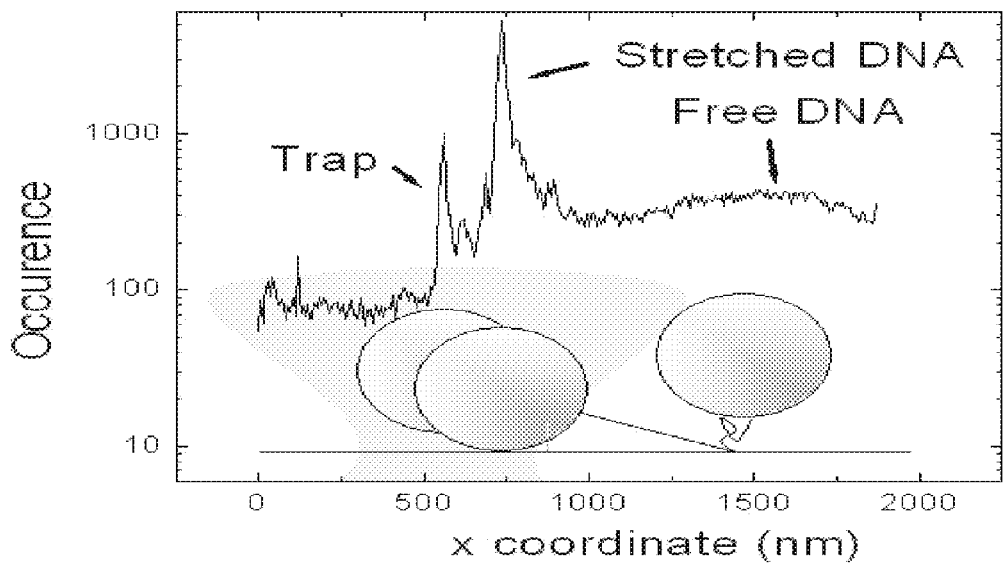
FIG. 25 provides a graph of results of stretching experiments of a DNA molecule that were imaged in an embodiment of a microscope of the present invention.

During the stretching experiments the position of the microspheres was measured both with the trap on and off when the Cy3 was locked to estimate an average displacement $x_b=762.5\pm5.5$ nm along the stretching axis, which is illustrated in FIG. 25. To estimate the end-to-end distance of the DNA molecule $x_{dna}$ we take into account the size of the microsphere $a=250$ nm as well as the length $x_{linker}$ of the DNA-bead and DNA-surface linkages. The PEG length is about 135 monomers (3400 kDa+5000 kDa=8400 kDa at 62 Da/monomer). The end-to-end distance of PEG at ~10 pN is ~0.15 nm/monomer (S6), i.e. the total length contribution from the PEG is 20 nm. The size of the anti-digoxigenin antibody is ~10 nm but there are uncertainties in its orientation. The size of the carbon-chain linkers between the DNA and the biotin and digoxigenin moieties is ~1 nm while the distance of biotin-binding sites on a streptavidin tetramer is ~2-3 nm. Thus the total linkage length is ~30 nm, with uncertainties ~5-10 nm due to the unknown orientation of the antibody and the streptavidin orientation as well as potential polydispersity of the PEG chains. The end-to-end distance is given by $x_{dna}=(a^2+x_b^2)^{1/2}-(a+x_{link})\approx 522$ nm with a total error of 11 nm obtained by combining the measurement error in $x_b$, the uncertainty in $x_{link}$ and the variability in bead radius a (5.7 nm based on 2.3% CV specifications from the manufacturer). The extension of the DNA for contour length 540 nm then is 96.7(±2) %.

Image Assymetry of DNA Complex Attached to Surface at Both Ends

Figure 26:
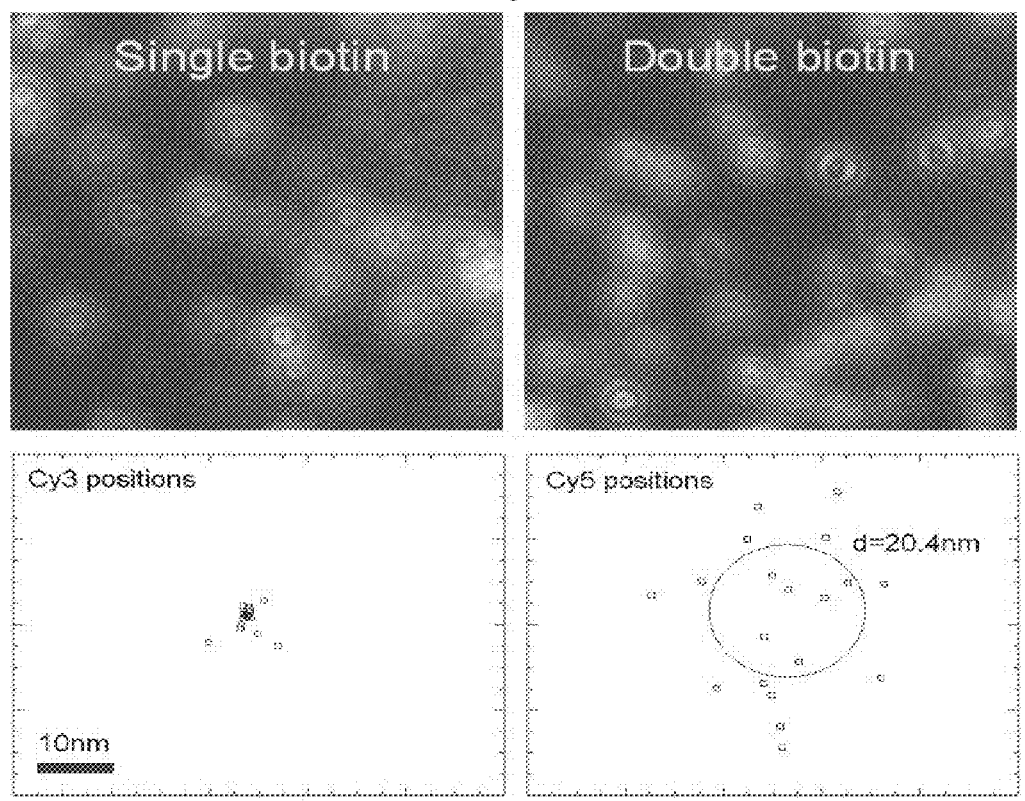
FIG. 26 provides images of Cy3 (top panels) and positions of Cy3 and Cy5(bottom left and right panels, respectively) from an embodiment of a microscope of the present invention.

FIG. 26 provides images of Cy3 (top panels) and positions of Cy3 and Cy5 (bottom left and right panel, respectively). The top left panel shows out of focus images of Cy3 on 20 bp DNA duplexes that are attached to a surface with a single biotin. The duplexes can rotate freely since they are attached to the surface at one end only and, thus, the Cy3 images appear isotropic. The top right panel shows out of focus images of Cy3 on 45 bp DNA duplexes that are attached to the surface with biotins on both ends. These duplexes are immobilized and a large fraction of the Cy3 molecules appear asymmetric due to the fixed orientation of their emission dipoles. The bottom panels show errors due to the asymmetry of the PSF for immobile dipole emission by Cy3 and Cy5 attached to 30 bp DNA duplexes, which were attached to the surface by biotins at both ends. The bottom left panel provides the locked position of Cy3 and the bottom right panel provides the position of Cy5 that is expected to fall on a circle of diameter 2×30 bp=20.4 nm. Deviations from expected positions are ~5-10 nm.

Additional Embodiments

Figure 27:
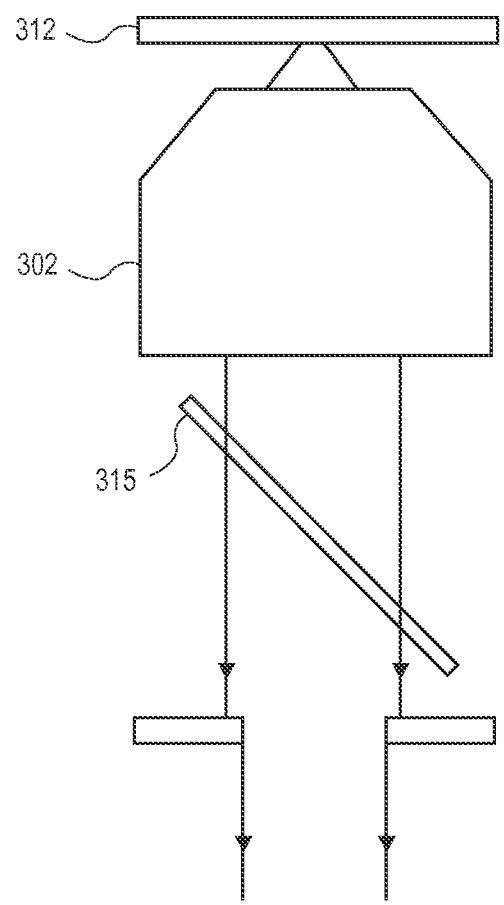
FIG. 27 illustrates an embodiment of a portion of optics of an embodiment of a microscope of the present invention.

FIG. 27 illustrates an embodiment of a portion 2700 of the optics of the microscope 300 including the objective 302, the translation stage 312, and the poly-chroic mirror 315 to which an aperture stop 2702 has been added. The aperture stop 2702 limits the amount of light collected from the objective 302. It can be used to reduce the effect of asymmetry caused by the dipole emission from fixed dye markers. For example, if the objective has a numeric aperture of 1.49 using the aperture stop to reduce it to, for example, 1.0 can reduce the effect of the asymmetry. Also, alignment of the aperture stop 2702 in conjunction with fixing the focus of the objective can be used to correct for PSF tilt.

Figure 28:
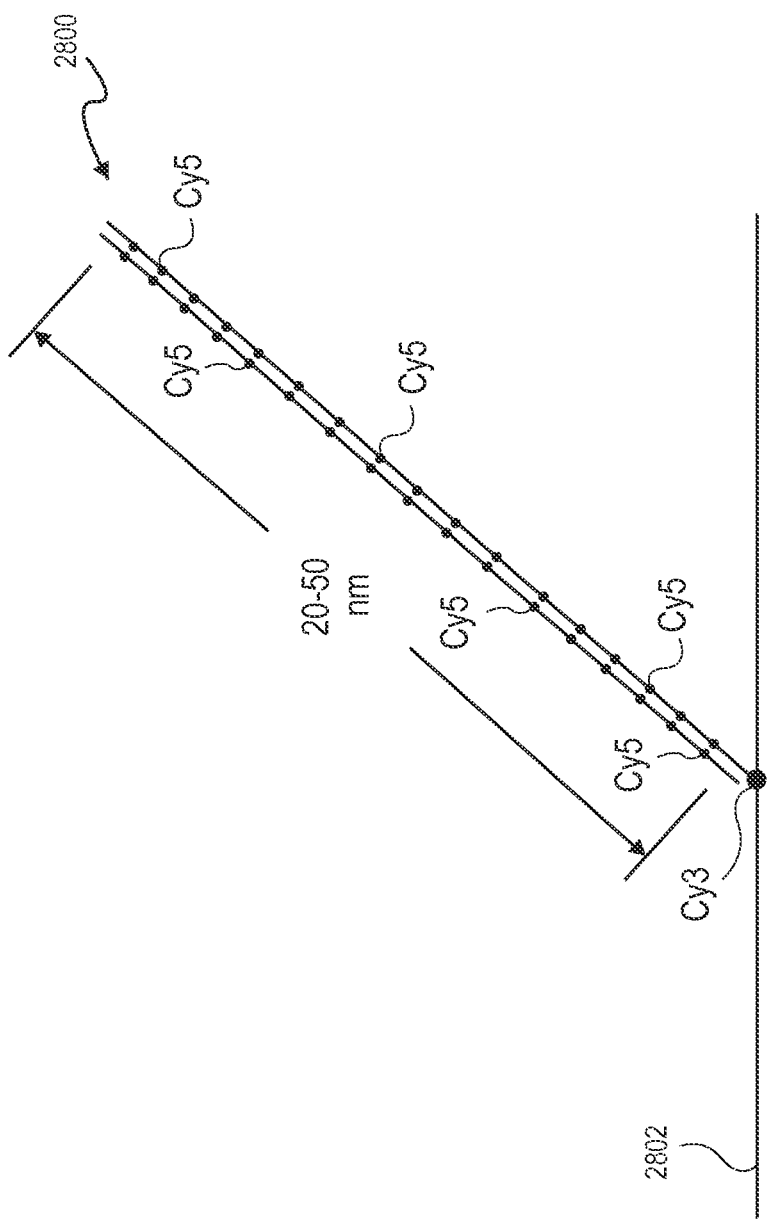
FIG. 28 illustrates a DNA molecule that may be imaged in an embodiment of a microscope of the present invention.

FIG. 28 illustrates a DNA molecule 2800 attached to a surface 2802 where a Cy3 marker is attached near an end of the DNA molecule that is attached to the surface 2802 and Cy5 markers are attached along a length of the molecule. Activation of the Cy3 marker provides a reference that is imaged by short wavelength path 232 of the imaging optics 106 (FIG. 2) for the end of the DNA molecule. By adding a light source for photo-bleaching of the Cy5 markers that have been activated by the red laser 318, random ones of the Cy5 markers can be activated and then photo-bleached. This time sequence activation of the Cy5 markers provides details of the structure of the DNA molecule. A similar technique may be used for obtaining details of structures of other molecules, multi-subunit complexes, sub-cellular structures, cell processes, etc.

Other options for multiple labeling with fluorophores that can be switched between bright and dark states are photoactivatable fluorescent proteins, "caged" organic dyes, fluorophores with long-lived triplet or other dark states, photoconvertible pairs comprised of a shorter wavelength activator dye molecule and a longer wavelength reporter dye molecule in close proximity, or "blinking" semiconductor nanoparticles. In addition to the Cy3 marker in FIG. 28, the reference object can be any other fluorophore with distinct emission from the markers attached to the molecule of interest. Alternatively, the reference object can be the bright field image of a small particle or other fiduciary mark rigidly attached to the sample. Alternatively, the reference object can also be imaged in the same color channel as the markers on the molecule of interest, if it is separated by more that the conventional diffraction limit.

The positions of the multiple markers on the molecule of interest can be measured by stochastic switching between a dark and a bright state, adjusting the rates of transitions between the dark and bright states such that only a single marker is bright in a diffraction-limited volume at any given time. Alternatively, a small number of markers can be bright at any given time and their positions estimated by treating in the numerical analysis the resulting images as the superposition of the images of the individual fluorophores. In another approach, the positions of the markers on the molecule of interest are measured by sequential binding and subsequent photobleaching or unbinding of the markers. The binding-unbinding or binding-photobleaching kinetics are adjusted so that only a single marker is visible in a diffraction limited volume at any given time. In yet another approach, the multiple fluorophores on the target molecule of interest are individually excited using a microscope with an engineered excitation point-spread function with width smaller than the diffraction limit, such as stimulated emission depletion excitation (STED microscope).

An embodiment of a method of calibrating CCD PRNU of the present invention includes illuminating a featureless sample (i.e. a sample without molecules or dirt such as a clean overslip) with a white light source. For example, the blue LED 326 in the microscope 300 (FIG. 3) may be replaced with a white LED or lamp to illuminate the featureless sample located on the stage 312. This projects a uniformly illuminated and feature-less field onto the CCD array 220 (FIG. 2) through the same light path as a fluorescence signal. An empirical technique that may be used to verify that the field image is indeed featureless is to move the objective 302 (FIG. 3) to various defocus positions and confirm that the results do not change. The method further includes acquiring images of the feature-less sample on the CCD array 220 at the acquisition settings used for actual experiments (i.e. same CCD temperature, exposure, read-out rate, pre-amplifier gain, etc.). Next, the illumination intensity is adjusted so that the mean read-out value of each pixel is roughly half a CCD A/D converter scale. Following this, the intensity I(i,j) of each pixel is measured by averaging enough frames to reduce the statistical uncertainty due to read-out noise and fluctuations in the illumination source. A CCD response map is given by $$R(i, j) = \frac{I(i, j)}{\langle I(i, j) \rangle},$$

where R(i,j) is a response of pixel (i,j) and $\langle I(i,j) \rangle$ is an average response over all CCD pixels. The CCD PRNU is PRNU(i,j)=(1−R(i,j)).

An embodiment of a method of calibrating intra-pixel PRNU (i.e. PRNU within individual pixels) includes focusing light on a region smaller that a pixel physical size. Typically, the pixel physical size for current sate-of-the-art back-thinned EM-CCDs is about 10-25 μm. Focusing the light on the region smaller than the pixel physical size can be accomplished with a long-working distance objective (e.g., an objective from Mitutoyo) that can produce a spot size less than about 3 μm. The spot is scanned across the CCD array while the signal from each pixel is read to produce a map of intra-pixel PRNU An embodiment of a method of correcting PRNU of the present invention includes correcting raw images for measured PRNU (e.g., inter-pixel PRNU or both inter- and intra-pixel PRNU) according to $$I(i, j) \rightarrow \frac{I(i, j)}{PRNU(i, j)}.$$

Subsequent localization analysis is done using the corrected images. This procedure may be carried out with images interpolated at sub-pixel values to utilize the intra-pixel PRNU calibration. In an alternative embodiment, a map $\delta \vec{x}_{PRNU}(\vec{x}_{CCD})$ of the localization errors due to the CCD PRNU is constructed The positions determined from the analysis of the raw images are then corrected according to $\vec{x}_{CCD} \rightarrow \vec{x}_{CCD} - \delta \vec{x}_{PRNU}(\vec{x}_{CCD})$.

Embodiments of a method of direct calibration for an effect of PRNU on localization accuracy (i.e. (mapping functions $\vec{f}$ and $\vec{g}$) include open-loop and closed-loop approaches. In the open-loop approach, the mapping functions $\vec{f}$ and $\vec{g}$ are calibrated directly by placing a fluorophore at known positions, for example on a square grid on the sample stage (i.e., using the piezoelectric stage) and measuring the corresponding positions on the CCD images. The open-loop approach is prone to errors due to sample drift. In the closed-loop approach, higher accuracy can be achieved by calibrating displacements of the CCD images against known displacements of the sample stage, while actively locking on a particular sub-pixel region of the CCD. In practice this is accomplished by adding a small modulation $\delta x(\omega)=A_0 \cos(\omega t)$ to the control signal of the feed-back loop that is sent to the piezo stage. The resulting modulation in position has amplitude $A(\omega) \approx A_0/I_G(\omega)$, where $I_G(\omega)$ is the gain of the feed-back loop at frequency $\omega$. This is essentially a measurement of the close-loop response of the position stabilization system, while locked at a particular set-point. Phase-sensitive lock-in detection can be used with the control oscillation as a reference to further reduce the noise in the displacement amplitude measurement.

Figure 29:
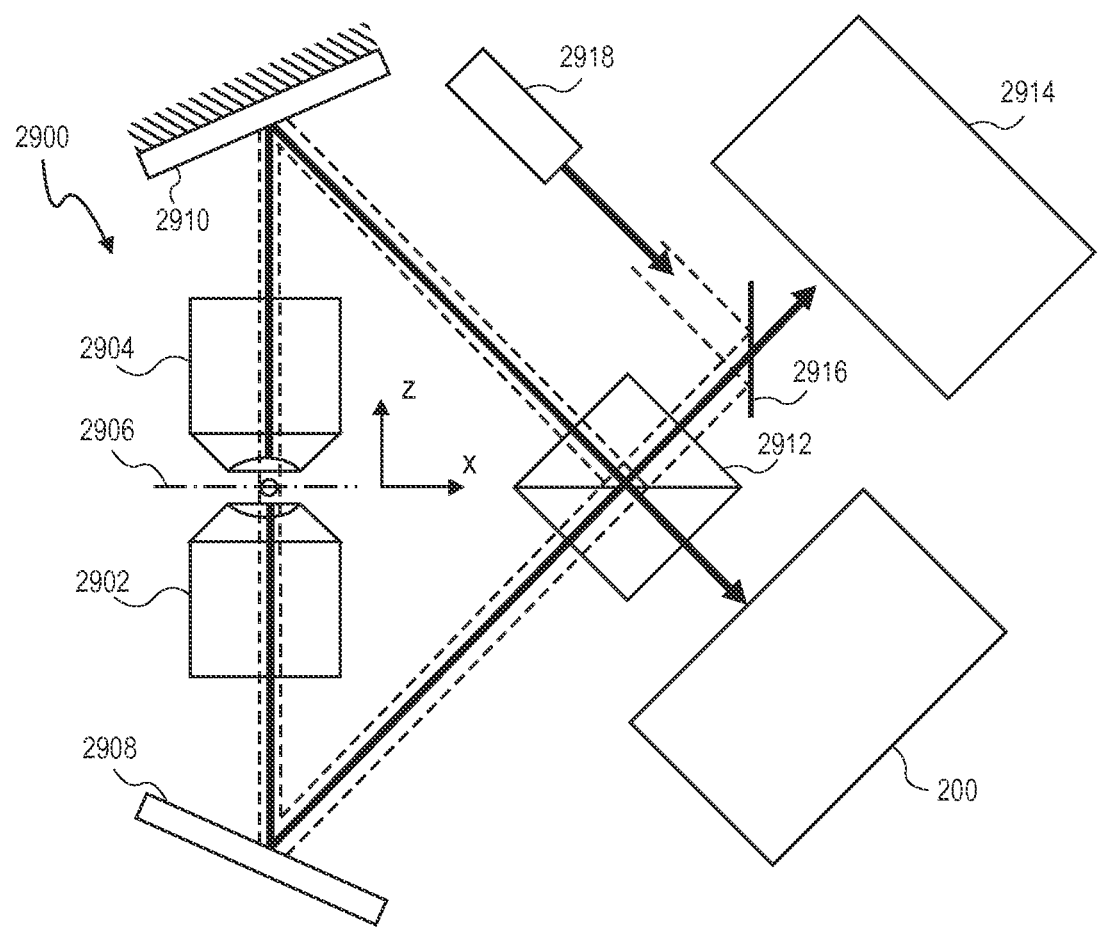
FIG. 29 illustrates an embodiment of a 4π interferometric microscope of the present invention.

An embodiment of a $4\pi$ interferometric microscope of the present invention is illustrated in FIG. 29. The $4\pi$ interferometric microscope 2900 includes first and second objectives, 2902 and 2904, a stage 2906, a fixed mirror 2908, a piezo-driven mirror 2910, a beam splitter 2912, the imaging arrangement 200, a z-axis detection arrangement 2914, dichroic mirrors 2916 (one shown), and fluorescence excitation lasers 2918 (one shown). The fixed mirror 2908, the piezo-driven mirror 2910, and the beam splitter 2912 form and interferometer. The $4\pi$ interferometric microscope 2900 achieves reduced Point-spread-function width in the z direction, using the two opposing objectives, 2902 and 2904, (e.g. NA=1.2, water-immersion) to collect fluorescence from a larger solid angle than a single lens. The excitation lasers 2918 (one shown) are coupled to the objectives, 2902 and 2904, by way of dichroic mirrors 2916 (one shown), the beam splitter 2912, the fixed mirror 2908, and the piezo-driven mirror 2910. Each of the excitation lasers 2918 forms a standing-wave interference pattern at the sample, with phase that can be adjusted by the modulating the piezo-driven mirror 2910. By making the path length in the two paths of the interferometer equal, the fluorescence emitted from a dye marker and collected by the two lenses can be recombined coherently. As the phase of the interferometer is modulated, the z-axis detection arrangement 2014 receives a fluorescence signal that shows a peak, which can be used to determine the z-coordinate of the dye marker. The imaging arrangement 200 (FIG. 2) forms images of the dye markers in x- and y-coordinates. The z-axis detection arrangement 2014 can be based on Avalanche-photodiode (confocal point detector setup) or fast EM-CCD (wide-field imaging setup) detectors to achieve high bandwidth.

Conclusion

The above specific description is meant to exemplify and illustrate the invention and should not be seen as limiting the scope of the invention, which is defined by the literal and equivalent scope of the appended claims. Any patents or publications mentioned in this specification are indicative of levels of those skilled in the art to which the patent or publication pertains as of its date and are intended to convey details of the invention which may not be explicitly set out but which would be understood by workers in the field. Such patents or publications are hereby incorporated by reference to the same extent as if each was specifically and individually incorporated by reference, such incorporation being for the purpose of further describing and enabling the method or material referred to.

What is claimed is:

1. An imaging device comprising:
   imaging optics including a detector, the detector defining an xy plane including a first and a second detector region, the imaging optics configured to separate light by wavelength into a first and a second light, project the first light onto a first area on the first detector region, and project the second light onto a second area of the second detector region;
   a fiducial light source optically coupled to the imaging optics, the imaging optics configured to:
      separate fiducial light from the fiducial light source into a first and a second fiducial light, and
      project the first fiducial light onto a third area of the first detector region and project the second fiducial light onto a fourth area of the second detector region;
   a control system electrically coupled to the imaging optics, the control system configured to adjust alignment of the imaging optics so that the first fiducial light projected onto the first detector region maintains a relatively constant x-position and y-position on the first detector region and the second fiducial light projected onto the second detector region maintains a relatively constant x-position and y-position on the second detector region; and
   a processing unit configured to receive data from the first and second detector regions and adjust the data to account for photo-response non-uniformities on the first and second detector regions.

2. The imaging device of claim 1 wherein the fiducial light source comprises a pin hole light source.

3. The imaging device of claim 1 wherein the fiducial light source is coupled to the imaging optics with an objective of a microscope.

4. The imaging device of claim 1 wherein the detector comprises a single detector, and wherein the single detector includes the first and second detector regions.

5. The imaging device of claim 1, wherein the imaging optics include:
   a first mirror associated with the first light, wherein an angle of the first mirror is configured to be changed so that the first fiducial light projected onto the first detector region maintains the relatively constant x-position and y-position on the first detector region; and
   a second minor associated with the second light, wherein an angle of the second mirror is configured to be changed so that the second fiducial light projected onto the second detector region maintains the relatively constant x-position and y-position on the second detector region.

6. The imaging device of claim 5, wherein the imaging optics include:
   a first piezoelectric crystal configured to change the angle of the first minor; and
   a second piezoelectric crystal configured to change the angle of the second mirror.

7. The imaging device of claim 1, wherein the detector comprises a charge coupled device (CCD) array.

8. A microscope comprising:
   a translation stage;
   an objective optically coupled to the stage and configured to collect light from a sample held by the stage;
   imaging optics optically coupled to the objective, the imaging optics including a detector, the detector defining an xy plane including a first and a second detector region, the imaging optics configured to separate the light by wavelength into a first and a second light, project the first light onto a first area of the first detector region, and project the second light onto a second area of the second detector region;

a fiducial light source optically coupled to the imaging
  optics, the imaging optics configured to:
  separate fiducial light from the fiducial light source into
    a first and a second fiducial light, and
  project the first fiducial light onto a third area of the first
    detector region and project the second fiducial light
    onto a fourth area of the second detector region;
a control system electrically coupled to the imaging optics,
  the control system configured to adjust alignment of the
  imaging optics so that the first fiducial light projected
  onto the first detector region maintains a relatively constant
  x-position and y-position on the first detector
  region and the second fiducial light projected onto the
  second detector region maintains a relatively constant
  x-position and y-position on the second detector region;
  and
a processing unit configured to receive data from the first
  and second detector regions and adjust the data to
  account for photo-response non-uniformities on the first
  and second detector regions.

9. The microscope of claim 8 wherein the fiducial light source is coupled to the imaging optics with the objective.

10. The microscope of claim 8 wherein the fiducial light source comprises a pin hole light source.

11. The microscope of claim 8 wherein the stage comprises a translation stage.

12. The microscope of claim 11 wherein the control system is configured to adjust a position of the translation stage to maintain the first light from the sample at a relatively constant x-position and y-position on the first detector region.

13. The microscope of claim 8 further comprising:
  a trap coupled to the stage, wherein the trap is configured to reduce Brownian motion of the sample.

14. The microscope of claim 13 wherein the trap comprises an optical trap including a trapping laser optically coupled to the objective and configured to provide a trapping laser beam.

15. The microscope of claim 8 wherein:
  the objective and the imaging optics are configured to reduce an effect of inhomogeneities of the first and the second detector regions.

16. The microscope of claim 8, wherein the imaging optics include:
  a first mirror associated with the first light, wherein an angle of the first mirror is configured to be changed so that the first fiducial light projected onto the first detector region maintains the relatively constant x-position and y-position on the first detector region; and
  a second minor associated with the second light, wherein an angle of the second mirror is configured to be changed so that the second fiducial light projected onto the second detector region maintains the relatively constant x-position and y-position on the second detector region.

17. A microscope comprising:
a translation stage;
an illumination arrangement optically coupled to the translation stage and configured to cause a first and a second fluorescent mark on the sample to fluoresce at a first and a second wavelengths to generate a first and a second fluorescent light;
an objective optically coupled to the translation stage and configured to collect the first and second fluorescent light;
imaging optics optically coupled to the objective and including a detector defining an xy plane including a first and a second detector region, the imaging optics configured to separate the first and the second fluorescent light by wavelength, project the first fluorescent light onto a first area of the first detector region, and project the second fluorescent light onto a second area of the second detector region;
a fiducial light source optically coupled to the imaging optics, the imaging optics configured to:
  separate fiducial light from the fiducial light source into a first and a second fiducial light, and
  project the first fiducial light onto a third area of the first detector region and project the second fiducial light onto a fourth area of the second detector region;
a control system electrically coupled to the imaging optics and the translation stage, the control system configured to adjust:
  alignment of the imaging optics so that the first fiducial light projected onto the first detector region maintains a relatively constant x-position and y-position on the first detector region and the second fiducial light projected onto the second detector region maintains a relatively constant x-position and y-position on the second detector region, and
  a position of the translation stage to maintain the first fluorescent light at a relatively constant x-position and y-position on the first detector region; and (this element is similar to the element recited in claim 9)
a processing unit configured to receive data from the first and second detector regions and adjust the data to account for photo-response non-uniformities on the first and second detector regions.

18. The microscope of claim 17, wherein the imaging optics include:
  a first mirror associated with the first light, wherein an angle of the first mirror is configured to be changed so that the first fiducial light projected onto the first detector region maintains the relatively constant x-position and y-position on the first detector region; and
  a second minor associated with the second light, wherein an angle of the second mirror is configured to be changed so that the second fiducial light projected onto the second detector region maintains the relatively constant x-position and y-position on the second detector region.

* * * * *